(12) United States Patent
Overton et al.

(10) Patent No.: US 8,467,650 B2
(45) Date of Patent: Jun. 18, 2013

(54) HIGH-FIBER-DENSITY OPTICAL-FIBER CABLE

(75) Inventors: Bob J. Overton, Lenoir, NC (US); Olivier Tatat, Sangatte (FR); Jean-Marc Testu, Antibes Juan les Pins (FR)

(73) Assignee: Draka Comteq, B.V., Amsterdam (NL)

( * ) Notice: Subject to any disclaimer, the term of this patent is extended or adjusted under 35 U.S.C. 154(b) by 172 days.

(21) Appl. No.: 12/907,241

(22) Filed: Oct. 19, 2010

(65) Prior Publication Data
US 2011/0069932 A1 Mar. 24, 2011

Related U.S. Application Data

(63) Continuation-in-part of application No. 12/267,732, filed on Nov. 10, 2008, now Pat. No. 8,265,442, and a continuation-in-part of application No. 12/614,011, filed on Nov. 6, 2009.

(60) Provisional application No. 60/986,737, filed on Nov. 9, 2007, provisional application No. 61/041,484, filed on Apr. 1, 2008, provisional application No. 61/112,595, filed on Nov. 7, 2008, provisional application No. 61/177,996, filed on May 13, 2009, provisional application No. 61/248,319, filed on Oct. 2, 2009, provisional application No. 61/252,941, filed on Oct. 19, 2009.

(51) Int. Cl.
*G02B 6/02* (2006.01)

(52) U.S. Cl.
USPC .......................................... 385/128; 385/100

(58) Field of Classification Search
USPC ................................................ 385/128, 100
See application file for complete search history.

(56) References Cited

U.S. PATENT DOCUMENTS

RE30,635 E 6/1981 Kuppers et al.
4,718,748 A 1/1988 Broer et al.
(Continued)

FOREIGN PATENT DOCUMENTS

EP 1650174 A2 4/2006
EP 1921478 A1 5/2008
(Continued)

OTHER PUBLICATIONS

International Preliminary on Patentability in commonly owned International Application No. PCT/US2008/082927, mailed May 20, 2010, pp. 1-16.
(Continued)

*Primary Examiner* — Ellen Kim
(74) *Attorney, Agent, or Firm* — Summa, Additon & Ashe, P.A.

(57) ABSTRACT

Disclosed is an improved optical fiber possessing a novel coating system. When combined with a bend-insensitive glass fiber, the novel coating system according to the present invention yields an optical fiber having exceptionally low losses. The coating system features (i) a softer primary coating with excellent low-temperature characteristics to protect against microbending in any environment and in the toughest physical situations and, optionally, (ii) a colored secondary coating possessing enhanced color strength and vividness. The secondary coating provides improved ribbon characteristics for structures that are robust, yet easily entered (i.e., separated and stripped). The optical fibers in accordance in the present invention may be incorporated into a reduced-diameter optical-fiber cable that possesses a high fiber count and a high cable fiber density. The high-fiber-density optical-fiber cable, which is suitable for deployments in ducts, is capable of achieving outstanding attenuation performance when subjected to temperature variations of between about −40° C. and 70° C.

34 Claims, 13 Drawing Sheets

U.S. PATENT DOCUMENTS

| | | | |
|---|---|---|---|
| 4,838,643 A | 6/1989 | Hodges et al. | |
| 4,848,869 A | 7/1989 | Urruti | |
| 4,852,968 A | 8/1989 | Reed | |
| 4,904,051 A | 2/1990 | Broer et al. | |
| 5,044,724 A | 9/1991 | Glodis et al. | |
| 5,062,685 A | 11/1991 | Cain et al. | |
| 5,146,531 A | 9/1992 | Shustack | |
| 5,574,816 A | 11/1996 | Yang et al. | |
| 5,717,805 A | 2/1998 | Stulpin | |
| 5,761,362 A | 6/1998 | Yang et al. | |
| 5,848,212 A * | 12/1998 | Wagman | 385/111 |
| 5,911,023 A | 6/1999 | Risch et al. | |
| 5,982,968 A | 11/1999 | Stulpin | |
| 6,035,087 A | 3/2000 | Bonicel et al. | |
| 6,041,153 A | 3/2000 | Yang | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,214,899 B1 | 4/2001 | Chawla et al. | |
| 6,215,931 B1 | 4/2001 | Risch et al. | |
| 6,240,224 B1 | 5/2001 | Reekie et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,411,403 B1 | 6/2002 | Siddhamalli | |
| 6,493,491 B1 | 12/2002 | Shen et al. | |
| 6,496,628 B1 * | 12/2002 | Opel et al. | 385/110 |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,694,079 B1 | 2/2004 | Matsuo et al. | |
| 6,749,446 B2 | 6/2004 | Nechitailo | |
| 6,901,197 B2 | 5/2005 | Hasegawa et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,961,508 B2 | 11/2005 | van Eekelen et al. | |
| 7,045,010 B2 | 5/2006 | Sturman, Jr. | |
| 7,085,466 B2 | 8/2006 | Roba et al. | |
| 7,095,940 B2 | 8/2006 | Hayami et al. | |
| 7,155,099 B2 * | 12/2006 | Broderick et al. | 385/125 |
| 7,162,128 B2 | 1/2007 | Lovie et al. | |
| 7,171,103 B2 | 1/2007 | Eekelen et al. | |
| 7,200,310 B2 | 4/2007 | Roba et al. | |
| 7,228,040 B2 | 6/2007 | Nakajima et al. | |
| 7,233,728 B2 * | 6/2007 | Aikawa et al. | 385/128 |
| 7,239,784 B2 | 7/2007 | Hayami et al. | |
| 7,272,289 B2 | 9/2007 | Bickham et al. | |
| 7,292,762 B2 | 11/2007 | Guan et al. | |
| 7,317,858 B2 | 1/2008 | Roba et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,433,566 B2 | 10/2008 | Bookbinder et al. | |
| 7,444,838 B2 | 11/2008 | Pickrell et al. | |
| 7,450,806 B2 | 11/2008 | Bookbinder et al. | |
| 7,450,807 B2 | 11/2008 | Bickham et al. | |
| 7,483,613 B2 | 1/2009 | Bigot-Astruc et al. | |
| 7,515,795 B2 | 4/2009 | Overton et al. | |
| 7,526,166 B2 | 4/2009 | Bookbinder et al. | |
| 7,526,169 B2 | 4/2009 | Bickham et al. | |
| 7,526,177 B2 | 4/2009 | Matthijsse et al. | |
| 7,555,186 B2 | 6/2009 | Flammer et al. | |
| 7,555,187 B2 | 6/2009 | Bickham et al. | |
| 7,567,739 B2 | 7/2009 | Overton et al. | |
| 7,567,742 B2 | 7/2009 | Pickrell et al. | |
| 7,569,801 B2 | 8/2009 | Oka | |
| 7,570,852 B2 | 8/2009 | Nothofer et al. | |
| 7,574,088 B2 | 8/2009 | Sugizaki et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 * | 1/2010 | Tatat | 385/113 |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,831,121 B2 | 11/2010 | Guan et al. | |
| 7,873,249 B2 | 1/2011 | Kachmar et al. | |
| 8,116,604 B2 * | 2/2012 | Bonicel et al. | 385/110 |
| 2002/0034367 A1 | 3/2002 | Gaillard et al. | |
| 2003/0102043 A1 * | 6/2003 | Field | 138/115 |
| 2004/0022511 A1 | 2/2004 | Eekelen et al. | |
| 2004/0208463 A1 | 10/2004 | Park | |
| 2005/0089289 A1 | 4/2005 | Hayami et al. | |
| 2006/0024010 A1 | 2/2006 | van Eekelen et al. | |
| 2007/0077016 A1 | 4/2007 | Bickham et al. | |
| 2008/0013898 A1 | 1/2008 | Wells | |
| 2008/0056654 A1 | 3/2008 | Bickham et al. | |
| 2008/0166094 A1 | 7/2008 | Bookbinder et al. | |
| 2008/0193092 A1 | 8/2008 | Greenwood et al. | |
| 2008/0240662 A1 | 10/2008 | Helvenstein | |
| 2008/0279514 A1 | 11/2008 | Kundis et al. | |
| 2008/0292262 A1 | 11/2008 | Overton et al. | |
| 2008/0304800 A1 | 12/2008 | Bickham et al. | |
| 2009/0060437 A1 | 3/2009 | Fini et al. | |
| 2009/0126407 A1 | 5/2009 | Bookbinder et al. | |
| 2009/0154888 A1 | 6/2009 | Abbott, III et al. | |
| 2009/0169163 A1 | 7/2009 | Abbott, III et al. | |
| 2009/0175583 A1 | 7/2009 | Overton | |
| 2009/0190887 A1 | 7/2009 | Freeland et al. | |
| 2009/0214167 A1 | 8/2009 | Lookadoo et al. | |
| 2009/0232461 A1 | 9/2009 | Nakajima et al. | |
| 2009/0252469 A1 | 10/2009 | Sillard et al. | |
| 2009/0274424 A1 | 11/2009 | Debut et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2009/0317039 A1 | 12/2009 | Blazer et al. | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0209059 A1 | 8/2010 | Conrad et al. | |
| 2010/0214649 A1 | 8/2010 | Burov et al. | |
| 2010/0215328 A1 | 8/2010 | Tatat et al. | |
| 2010/0254653 A1 | 10/2010 | Molin et al. | |
| 2010/0254668 A1 | 10/2010 | Consonni et al. | |
| 2010/0266249 A1 * | 10/2010 | Bonicel et al. | 385/110 |
| 2010/0310218 A1 | 12/2010 | Molin et al. | |
| 2011/0026889 A1 | 2/2011 | Risch et al. | |
| 2011/0044595 A1 | 2/2011 | Sillard et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0091171 A1 | 4/2011 | Tatat et al. | |

FOREIGN PATENT DOCUMENTS

| | | |
|---|---|---|
| WO | 97/42130 A1 | 11/1997 |
| WO | 01/05724 A2 | 1/2001 |
| WO | 02/055614 A2 | 7/2002 |
| WO | 03/091178 A | 11/2003 |
| WO | 03/091781 A1 | 11/2003 |
| WO | 2008/157341 A2 | 12/2008 |
| WO | 2009/062131 A1 | 5/2009 |
| WO | 2009/064381 A1 | 5/2009 |
| WO | 2010/053356 A2 | 5/2010 |

OTHER PUBLICATIONS

U.S. Appl. No. 61/147,586, filed Jan. 27, 2009, pp. 1-63.
U.S. Appl. No. 61/147,590, filed Jan. 27, 2009, pp. 1-54.
U.S. Appl. No. 61/154,538, filed Feb. 23, 2009, pp. 1-73.
U.S. Appl. No. 61/239,055, filed Sep. 1, 2009, pp. 1-20.
U.S. Appl. No. 61/242,618, filed Sep. 15, 2009, pp. 1-25.
U.S. Appl. No. 61/155,317, filed Feb. 25, 2009, pp. 1-28.
U.S. Appl. No. 61/185,462, filed Jun. 9, 2009, pp. 1-66.
U.S. Appl. No. 61/230,158, filed Jul. 31, 2009, pp. 1-41.
U.S. Appl. No. 61/241,592, filed Sep. 11, 2009, pp. 1-63.
U.S. Appl. No. 61/243,626, filed Sep. 18, 2009, pp. 1-71.
U.S. Appl. No. 61/242,287, filed Sep. 14, 2009, pp. 1-26.
U.S. Appl. No. 60/986,737, filed Nov. 9, 2007, pp. 1-65.
U.S. Appl. No. 61/041,484, filed Apr. 11, 2008, pp. 1-82.
U.S. Appl. No. 61/112,595, filed Nov. 7, 2008, pp. 1-321.
U.S. Appl. No. 61/101,337, filed Sep. 30, 2008, pp. 1-66.
U.S. Appl. No. 61/112,006, filed Nov. 6, 2008, pp. 1-68.
U.S. Appl. No. 61/112,374, filed Nov. 7, 2008, pp. 1-85.
U.S. Appl. No. 61/096,545, filed Sep. 12, 2008, pp. 1-37.
U.S. Appl. No. 61/096,750, filed Sep. 12, 2008, pp. 1-60.
Overton et al., Microbending-Resistant Fiber, Draka Communications, IWCS Proceedings (Nov. 2008), pp. 1-21.
Overton, et al., New Optical Fiber Coating System Optimized for FTTx Applications, Draka Comteq, IWCS Proceedings, Orlando, FL (Nov. 2007), pp. 1-25.
International Search Report and Written Opinion in commonly owned International Application No. PCT/US2008/082927, dated Mar. 31, 2009, pp. 1-25.
Corning, Product Information for "Corning ClearCurve Optical Fiber With Corning nanoStructures Technology," (Feb. 2009), pp. 1-10.
Ramachandran, et al., "Measurement of Multipath Interference in the Coherent Crosstalk Regime," IEEE Photonics Technology Letters, vol. 15, No. 8, pp. 1171-1173, Aug. 2003.
Zheng et al., "Measurement and System Impact of Multipath Interference From Dispersion Compensating Fiber Modules," IEEE Transaction on Instrumentation and Measurement, vol. 53, No. 1, pp. 15-23, Feb. 2004.
Botineau et al. in "Effective Stimulated Brillouin Gain in Single Mode Optical Fibers," Electronics Letters, vol. 31, No. 23 (1995), pp. 2032-2034.
European Office Action in commonly owned European Application No. 08848453 dated Apr. 27, 2011, pp. 1-8.
International Search Report and Written Opinion in counterpart International Application No. PCT/NL2009/000214 dated Apr. 28, 2011, pp. 1-12.
Corning, "High Temperature/Harsh Environment Single-mode & Multimode Specialty Fibers," PI 1500, Issued Jan. 2008, pp. 1-2.
Commonly owned U.S. Appl. No. 12/774,845, filed May 6, 2010, pp. 1-125.
International Preliminary Report on Patentability in commonly owned International Application No. PCT/NL2009/000214 dated May 26, 2011, pp. 1-8.
Draka Comteq product specification, "Enhanced Single Mode Fiber (ESMF)," (May 2009) pp. 1-2.
Draka Comteq product specification, "BendBright™ single-mode optical fiber," (May 2009) pp. 1-2.
Draka Comteq product specification, "BendBrightXS™ single mode optical fiber," (May 2009) pp. 1-2.
Draka Comteq product specification, "BendBright-EliteTM single-mode optical fiber," (May 2009) pp. 1-2.
U.S. Appl. No. 61/252,941, for a High-Fiber-Density Optical-Fiber Cable, Oct. 19, 2009, pp. 1-29.
U.S. Appl. No. 61/177,996 for a Reduced-Diameter Optical Fiber, May 13, 2009, pp. 1-57.
U.S. Appl. No. 61/248,319 for a Reduced-Diameter Optical Fiber, Oct. 2, 2009, pp. 1-99.
Draka Comteq product specification, "FTTH Outdoor Distribution Flextube Cable, BendBright XS Fibre," (Jan. 2011) pp. 1-2.
European Office Action in commonly owned European Application No. 09748856.3 dated Feb. 27, 2013, pp. 1-4.
Sarkar et al., "High Performance UV-Cured Optical fiber Primary Coating", Fiber and Integrated Optics, vol. 6, No. 2 (1987), pp. 125-131.
Summons to Oral Proceedings in commonly owned European Application No. 08848453.0 dated Feb. 26, 2013, pp. 1-11.

* cited by examiner

HIGH-FIBER-DENSITY OPTICAL-FIBER CABLE

CROSS-REFERENCE TO PRIORITY APPLICATION

This application is a continuation-in-part of commonly assigned U.S. patent application Ser. No. 12/267,732 for a Microbend-Resistant Optical Fiber (filed Nov. 10, 2008, and published Jul. 9, 2009, as U.S. Patent Application Publication No. 2009/0175583 A1), which itself claims the benefit of U.S. Patent Application No. 60/986,737 for a Microbend-Resistant Optical Fiber (filed Nov. 9, 2007), U.S. Patent Application No. 61/041,484 for a Microbend-Resistant Optical Fiber (filed Apr. 1, 2008), and U.S. Patent Application No. 61/112,595 for a Microbend-Resistant Optical Fiber (filed Nov. 7, 2008).

This application is also a continuation-in-part of commonly assigned U.S. patent application Ser. No. 12/614,011 for a Reduced-Diameter Optical Fiber (filed Nov. 6, 2009, and published May 13, 2010, as U.S. Patent Application Publication No. 2010/0119202 A1), which itself claims the benefit of U.S. Patent Application No. 61/112,595 for a Microbend-Resistant Optical Fiber (filed Nov. 7, 2008), U.S. Patent Application No. 61/177,996 for a Reduced-Diameter Optical Fiber (filed May 13, 2009), and U.S. Patent Application No. 61/248,319 for a Reduced-Diameter Optical Fiber (filed Oct. 2, 2009).

This application further claims the benefit of commonly assigned U.S. Patent Application No. 61/252,941, for a High-Fiber-Density Optical-Fiber Cable (filed Oct. 19, 2009).

Each of the foregoing commonly assigned patent applications and patent publications is hereby incorporated by reference in its entirety.

FIELD OF THE INVENTION

The present invention embraces optical fibers possessing an improved coating system that reduces stress-induced microbending. The present invention further embraces reduced-diameter optical-fiber cables, such as optical-fiber cables having a high fiber count and a high fiber density.

BACKGROUND OF THE INVENTION

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing are often critical, too. Installation of conduits suitable for traditional cable designs is often prohibitive in existing infrastructure. Thus, existing small ducts or tight pathways have to be used for new fiber installations. Low-cost and reduced-size requirements are driving in a direction that reduces protection for the optical fibers (i.e., away from conventionally robust, more bulky cable designs).

Glass designs are now available that offer reduced sensitivity to small bending radius (i.e., decreased added attenuation due to the phenomenon known as macrobending). These include trench-assisted core design or void-assisted fibers. Glass designs with lower mode field diameter are less sensitive to macrobending effects, but are not compatible with the G.652 SMF standard. Single-mode optical fibers that are compliant with the ITU-T G.652.D requirements are commercially available, for instance, from Draka Comteq (Claremont, N.C.).

Microbending is another phenomenon that induces added loss in fiber signal strength. Microbending is induced when small stresses are applied along the length of an optical fiber, perturbing the optical path through microscopically small deflections in the core.

In this regard, U.S. Pat. No. 7,272,289 (Bickham et al.), which is hereby incorporated by reference in its entirety, proposes an optical fiber having low macrobend and microbend losses. U.S. Pat. No. 7,272,289 broadly discloses an optical fiber possessing (i) a primary coating having a Young's modulus of less than 1.0 MPa and a glass transition temperature of less than −25° C. and (ii) a secondary coating having a Young's modulus of greater than 1,200 MPa.

Nonetheless, better protection against microbending is still needed to help ensure successful deployment in more FTTx applications. To this end, it is necessary to discover and implement new coating systems that better address the demands FTTx installations place on fiber and cable structures in a way that is commercially practical (i.e., cost-effective).

As compared with traditional wire-based networks, optical-fiber communication networks are capable of transmitting significantly more information at significantly higher speeds. Optical fibers, therefore, are being increasingly employed in communication networks.

To expand total transmission throughput, optical-fiber network providers are attempting to place ever more optical fibers in ever-smaller spaces. Packing fibers into tight spaces, however, can cause undesirable attenuation. Indeed, there is an inherent trade-off between increased fiber density and signal attenuation.

Fiber optic cables are commonly deployed in ducts (e.g., ducts having an outer diameter of about 42 millimeters). Traditional duct installation, however, uses space inefficiently. The typical capacity of such ducts has been one cable per duct, although in some cases two cables have been installed.

In this regard, it is desirable to achieve optical-fiber cables having a reduced diameter such that multiple (e.g., three) optical-fiber cables can be installed in a duct. It is also desirable to achieve optical-fiber cables having a high fiber density. Moreover, it is desirable to achieve high-fiber-density optical-fiber cables having satisfactory attenuation performance.

Additionally, it is desirable for optical-fiber cables deployed in ducts to be robust enough to withstand mechanical stresses that may occur during installation. Such optical-fiber cables should also be able to withstand conditions of use over a wide temperature range, such as between about −20° C. and 50° C. Indeed, it is desirable for optical-fiber cables to be able to withstand an even wider temperature range, such as between about −40° C. and 70° C.

SUMMARY OF THE INVENTION

Accordingly, it is an object of the present invention to provide an optical fiber having an improved coating system that provides improved protection against stress-induced microbending.

It is another object to provide an improved coating system that can be readily mated with bend-insensitive optical fiber, as well as G.652-compliant fiber.

It is yet another object to provide an improved optical fiber coating system including a primary coating that possesses a low modulus to provide enhanced cushioning against lateral and axial stresses induced by external forces.

It is yet another object to provide an improved optical fiber coating system including a primary coating that possesses an exceptionally low glass transition temperature ($T_g$) that reduces temperature-induced stresses in unusually cold environments.

It is yet another object to provide an improved optical fiber coating system including a primary coating that possesses an improved curing rate.

It is yet another object to provide an improved optical fiber coating system including an ink-free secondary coating that has improved brightness and visibility.

It is yet another object to provide an improved optical fiber coating system that can be applied at commercial processing speeds (e.g., forming the primary coating at rates of at least about 20 meters per second).

It is yet another object to provide an optical fiber possessing coatings that are readily stripped.

It is yet another object to provide an optical fiber having enhanced performance characteristics for use in FTTx installations in which conventional, robust cable designs are impractical.

It is yet another object to provide an optical fiber that synergistically combines a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

It is yet another object to provide an optical fiber that can be advantageously deployed in buffer tubes and/or fiber optic cables.

It is yet another object to provide an optical fiber that requires less external protection (e.g., enclosed within thinner buffer tubes and/or cable jacketing).

It is yet another object to provide a bend-insensitive optical fiber possessing a reduced diameter (e.g., having thinner coating layers and/or a thinner component glass fiber).

It is yet another object to provide an optical fiber that can be installed in a way that employs small-radius bends.

It is yet another object to provide an optical fiber that facilitates direct installation onto buildings or other structures (e.g., stapled or otherwise secured to structural surfaces).

It is yet another object of the present invention to provide a reduced-diameter optical-fiber cable having a high fiber count and a high fiber density.

It is yet another object of the present invention to provide a reduced-diameter optical-fiber cable having a cable jacket formed of a material with a low coefficient of friction, thereby allowing three reduced-diameter optical-fiber cables to be concurrently pulled over 300 meters through a cable duct having an inner diameter of about 42 millimeters.

It is yet another object of the present invention to provide a high-fiber-density optical-fiber cable having satisfactory crush resistance.

It is yet another object of the present invention to provide a high-fiber-density optical-fiber cable having an operating temperature between about −30° C. and 60° C.

It is yet another object of the present invention to provide a high-fiber-density optical-fiber cable having a storage temperature between about −40° C. and 70° C.

It is yet another object of the present invention to provide a reduced-diameter optical-fiber cable (e.g., a cable having an outer diameter of about 16 millimeters or less) that includes at least about 720 optical fibers.

It is yet another object of the present invention to provide a reduced-diameter optical-fiber cable (e.g., a cable having an outer diameter of about 17 millimeters or less) that includes at least about 864 optical fibers.

It is yet another object of the present invention to provide high-fiber-density optical-fiber cables that are capable of efficient installation into ducts.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
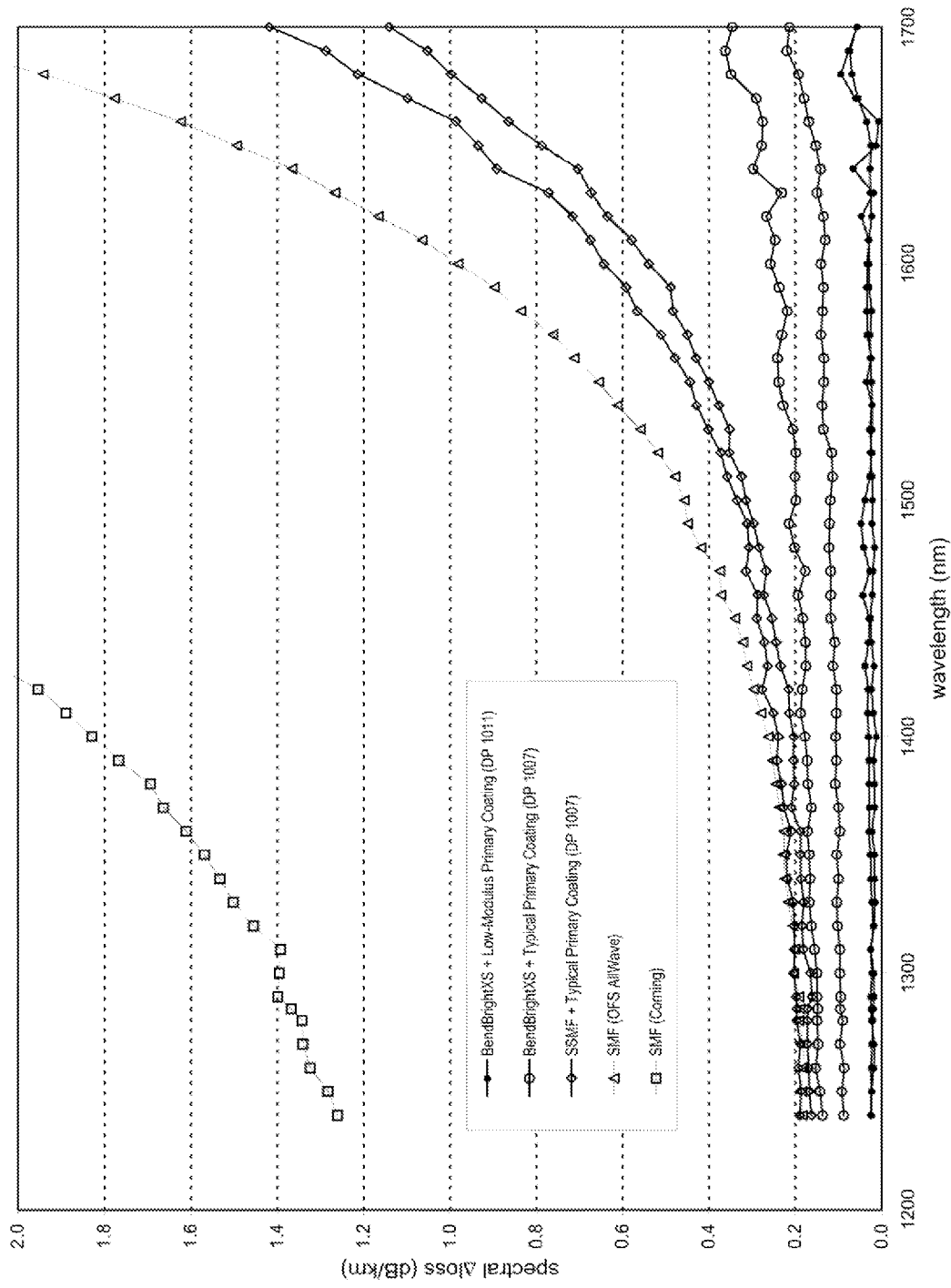
FIG. 1 depicts microbend testing results demonstrating that exceptionally low microbending losses are achieved, in accordance with the present invention, by pairing a bend-insensitive glass fiber with a low-modulus primary coating.

In one aspect, the present invention embraces optical fibers possessing an improved coating system that reduces stress-induced microbending, even in exceptionally cold environments required for FTTx deployments. The coating system according to the present invention includes a primary coating that combines low in situ modulus (e.g., less than about 0.5 MPa as measured on the fiber) and low glass transition temperature ($T_g$) (e.g., less than about −50° C.) to reduce stresses caused by external force and temperature. In addition, the coating system can be processed at high production speeds (e.g., 15-20 msec or more).

The present invention achieves a microbend-resistant optical fiber, particularly a single-mode optical fiber, by employing as its primary coating a UV-curable, urethane acrylate composition. In this regard, the primary coating includes between about 40 and 80 weight percent of polyether-urethane acrylate oligomer as well as photoinitiator, such as LUCERIN TPO, which is commercially available from BASF. In addition, the primary coating includes one or more oligomers and one or more monomer diluents (e.g., isobornyl acrylate), which may be included, for instance, to reduce viscosity and thereby promote processing. A suitable composition for the primary coating according to the present invention is a UV-curable urethane acrylate product provided by DSM Desotech (Elgin, Ill.) under the trade name DeSolite® DP 1011.

In this regard, this application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. patent application Ser. No. 12/098,804 for a Transmission Optical Fiber Having Large Effective Area (Sillard et al.), filed Apr. 7, 2008; U.S. Patent Application Publication No. US2009/0252469 A1 for a Dispersion-Shifted Optical Fiber (Sillard et al.); U.S. Patent Application Publication No. US2009/0279835 for a Single-Mode Optical Fiber Having Reduced Bending Losses (de Montmorillon et al.); U.S. Patent Application Publication No. US2009/0279836 for a Bend-Insensitive Single-Mode Optical Fiber (de Montmorillon et al.); U.S. Patent Application Publication No. US2010/0021170 for a Wavelength Multiplexed Optical System with Multimode Optical Fibers (Lumineau et al.); U.S. Patent Application Publication No. US2010/0028020 for Multimode Optical Fibers (Gholami et al.); U.S. Patent Application Publication No. US2010/0118388 for an Amplifying Optical Fiber and Method of Manufacturing (Pastouret et al.); U.S. Patent Application Publication No. US2010/0135627 for an Amplifying Optical Fiber and Production Method (Pastouret et al.); U.S. Patent Application Publication No. US2010/0142033 for an Ionizing Radiation-Resistant Optical Fiber Amplifier (Regnier et al.); U.S. Patent Application Publication No. US2010/0189397 for a Single-Mode Optical Fiber (Richard et al.); U.S. Patent Application Publication No. US2010/0189399 for a Single-Mode Optical Fiber Having an Enlarged Effective Area (Sillard et al.); U.S. Patent Application Publication No. US2010/0189400 for a Single-Mode Optical Fiber (Sillard et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); and U.S. patent application Ser. No. 12/884,834 for a Multimode Optical Fiber, filed Sep. 17, 2010, (Molin et al.).

One exemplary glass fiber, for instance, possesses a step-index core having a refractive index that is between about 0.003 and 0.006 higher than the refractive index of its adjacent silica cladding.

Exemplary single-mode glass fibers for use in the present invention are commercially available from Draka Comteq (Claremont, N.C.) under the trade name BendBright®, which is compliant with the ITU-T G.652.D requirements, and the trade name BendBright$^{XS}$®, which is compliant with the ITU-T G.657.A/B and ITU-T G.652.D requirements.

In particular and as set forth herein, it has been unexpectedly discovered that the pairing of a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× (e.g., 40× to 100× or more) as compared with a single-mode fiber employing a conventional coating system). Draka Comteq's bend-resistant, single-mode glass fiber available under the trade name BendBright$^{XS}$® employs a trench-assisted design that reduces microbending losses.

FIG. 1 depicts this outstanding result by comparing the aforementioned exemplary single-mode fiber according to the present invention with various single-mode fibers employing conventional coating systems. In this regard, FIG. 1 presents spectral attenuation data by measuring initial spectral attenuation on the optical fiber on a shipping spool, thereby obtaining the peaks and valleys typical of the attenuation across the full spectrum of wavelengths between the limits shown. The optical fiber is then wound onto a sandpaper-covered, fixed-diameter drum (i.e., measurement spool) as described by the IEC fixed-diameter sandpaper drum test (i.e., IEC TR62221, Method B), and another spectral attenuation curve is obtained.

The IEC fixed-diameter sandpaper drum test (i.e., IEC TR62221, Method B) provides a microbending stress situation that affects single-mode fibers even at room temperature. The sandpaper, of course, provides a rough surface that subjects the optical fiber to thousands, if not millions, of stress points. With respect to the test data presented in FIG. 1, a 300-mm diameter fiber spool was wrapped with adhesive-backed, 40-micron grade sandpaper (i.e., approximately equivalent to 300-grit sandpaper) to create a rough surface. Then, 400-meter fiber samples were wound at about 2,940 mN (i.e., a tension of 300 gf on a 300-mm diameter cylinder), and spectral attenuation was measured at 23° C.

The curves presented in FIG. 1 represent the difference between the initial spectral curve and the curve when the fiber is on the sandpaper drum, thereby providing the added loss due to microbending stresses.

Those having ordinary skill in the art will recognize cable designs are now employing smaller diameter buffer tubes and less expensive materials in an effort to reduce costs. Consequently, when deployed in such cable designs, single-mode optical fibers are less protected and thus more susceptible to stress-induced microbending. As noted, the present invention provides an improved coating system that better protects optical fibers against stresses caused by external mechanical deformations and by temperature-induced, mechanical property changes to the coatings.

As noted, conventional solutions for protecting optical fibers involved using large-diameter buffer tubes, buffer tubes made of high-modulus materials that resist deformation and stresses upon the fiber, and stronger, thicker cable jackets to resist deformations that might pinch or otherwise squeeze the optical fibers. These solutions, however, are not only costly, but also fail to address the temperature-induced stresses caused by changes to the protective coatings. In other words, conventional primary coatings possess high modulus at temperatures below their respective glass transition temperatures.

As disclosed herein, the optical fiber according to the present invention includes a primary coating possessing lower modulus and lower glass transition temperature than possessed by conventional single-mode fiber primary coatings. Even so, the improved primary coating formulation nonetheless facilitates commercial production of the present optical fiber at excellent processing speeds (e.g., 1,000 m/min or more). In this regard, the primary coating employed in the optical fibers of the present invention possesses fast curing rates—reaching 50 percent of full cure at a UV dose of about 0.3 $J/cm^2$, 80 percent of full cure at a UV dose of about 0.5 $J/cm^2$, and 90 percent of full cure at a UV dose of about 1.0 $J/cm^2$ as measured on a standard 75-micron film at 20° C. and atmospheric pressure (i.e., 760 ton) (i.e., standard temperature and pressure—STP).

Figure 2:
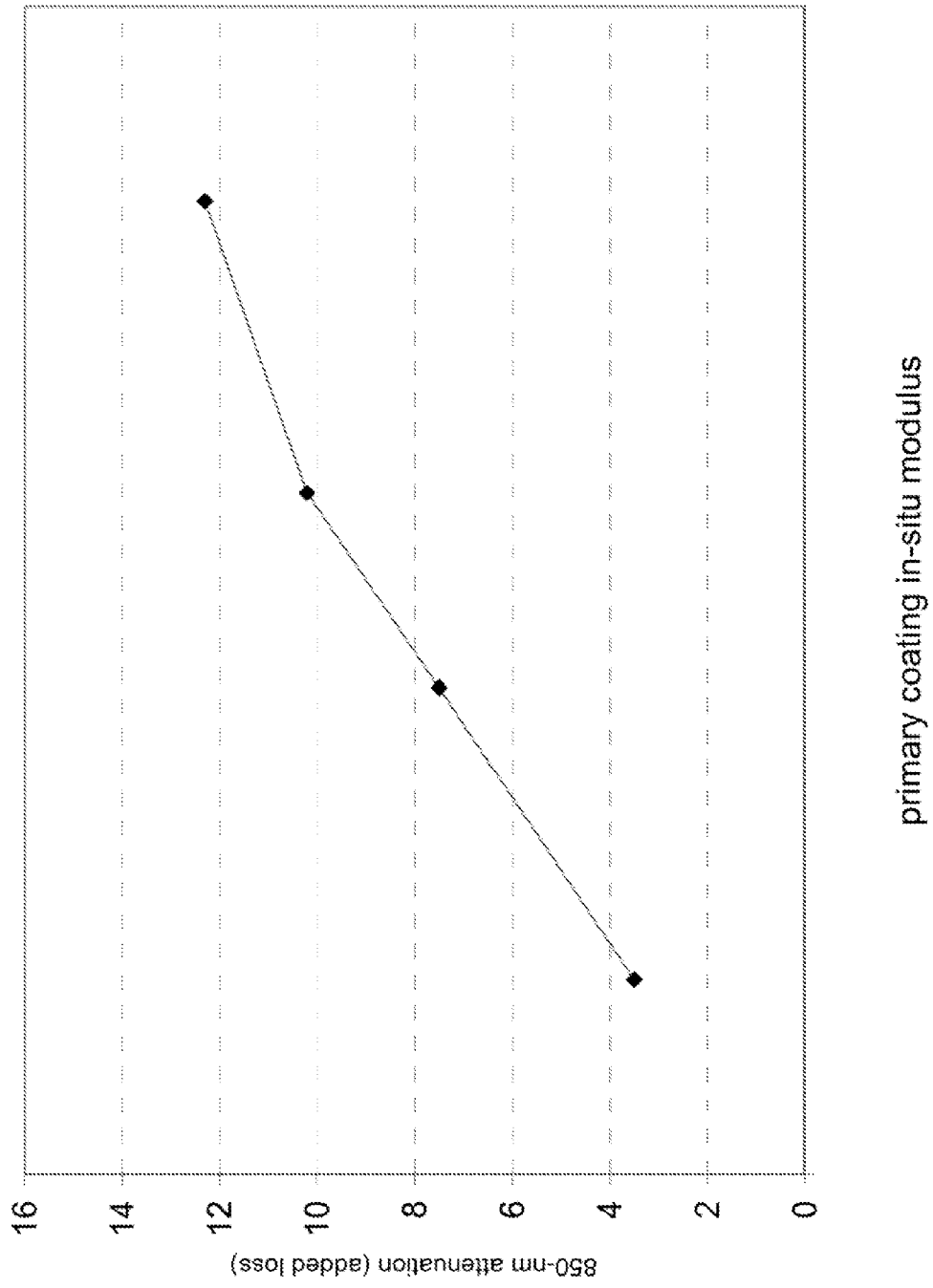
FIG. 2 schematically depicts the relationship between the in situ modulus of a primary coating and added loss for a multimode optical fiber.

FIG. 2 schematically depicts the observed relationship between the in situ modulus of a primary coating and the attenuation (added loss) of the optical fiber, here a 50-micron graded-index multimode fiber. The primary coating modulus is measured as cured on the glass fiber and the added loss is measured using a fixed-diameter sandpaper drum procedure in accordance with the IEC TR62221 microbending-sensitivity technical report and standard test procedures (e.g., IEC TR62221, Method B, Ed. 1), which are hereby incorporated by reference in their entirety.

As will be appreciated by those having ordinary skill in the art, prior, commercially available single-mode fibers typically include a Young's modulus of 100-150 psi measured in situ (i.e., on the fiber). The optical fiber according to the present invention possesses a primary coating having reduced modulus as compared with such commercially available primary coatings. Employing a lower modulus primary coating provides better cushioning around the glass fiber.

Although lower modulus of the in situ primary coating can be achieved by selectively undercuring, the present invention achieves in situ primary coating having lower modulus even approaching full cure (i.e., near full cure). In this regard, the modulus of the in situ primary coating according to the present invention is less than about 0.65 MPa (e.g., less than about 95 psi), typically less than about 0.5 MPa, and more typically less than about 0.4 MPa (e.g., between about 0.3 MPa and 0.4 MPa or between about 40 psi and 60 psi). It has been determined that an in situ primary coating having a modulus of less than about 0.5 MPa significantly reduces bend sensitivity of the glass fiber. On the other hand, the modulus of the in situ primary coating according to the present invention is typically greater than about 0.2 MPa (e.g., 0.25 MPa or more).

To achieve its reduced modulus as compared with conventional optical fiber coatings, the present primary coating possesses a lower crosslink density, specifically a reduced concentration of the reactive acrylate groups. Those having ordinary skill in the art will appreciate that acrylate groups crosslink via the free radical polymerization during photoinitiation (e.g., UV-induced curing during drawing operations). The reaction kinetics dictate reduced cure rates during processing. This is commercially undesirable, of course, and so the present invention implements processing modifications to provide satisfactory cure rate for the low-modulus primary coating.

There are at least two components of the curing process that retard the rate of polymerization of the primary coating. First, the combination of (i) high curing temperatures induced by exposure to a high-intensity, UV environment and (ii) the exothermic polymerization reaction slows the observed curing rate of the primary coating. Second, close proximity of stacked UV lamps, in effect, creates rapidly superposed, repeated photoinitiation periods. The reaction rate of acrylate groups under this configuration is likewise retarded—a somewhat counterintuitive result. With respect to the latter, disposing (i.e., positioning) UV lamps to increase the period between consecutive UV exposures significantly increases the degree of coating cure as compared with other conventional processes employing the same draw speed and UV dose. In this way, it is possible to process the reduced-modulus, primary coating according to the present invention in a way that achieves near-complete curing at fast fiber draw speeds, which are required for a commercially viable process. An exemplary method and apparatus for curing a coated fiber is disclosed in commonly assigned U.S. Pat. No. 7,322,122, which is hereby incorporated by reference in its entirety.

The temperature dependence of the modulus is an important consideration to ensure that the primary coating provides enhanced microbending protection in FTTx applications. A primary coating having low modulus only at room temperature would be inadequate because deployment in the field will expose the optical fiber to microbend-inducing stresses at extreme environmental temperatures (e.g., −40° C. and below). Therefore, a suitable primary coating according to the present invention possesses an exceptionally low glass transition temperature so that the primary coating remains soft and protective in extremely cold environmental conditions.

Example 1

Comparison of Mechanical Properties

Figure 3:
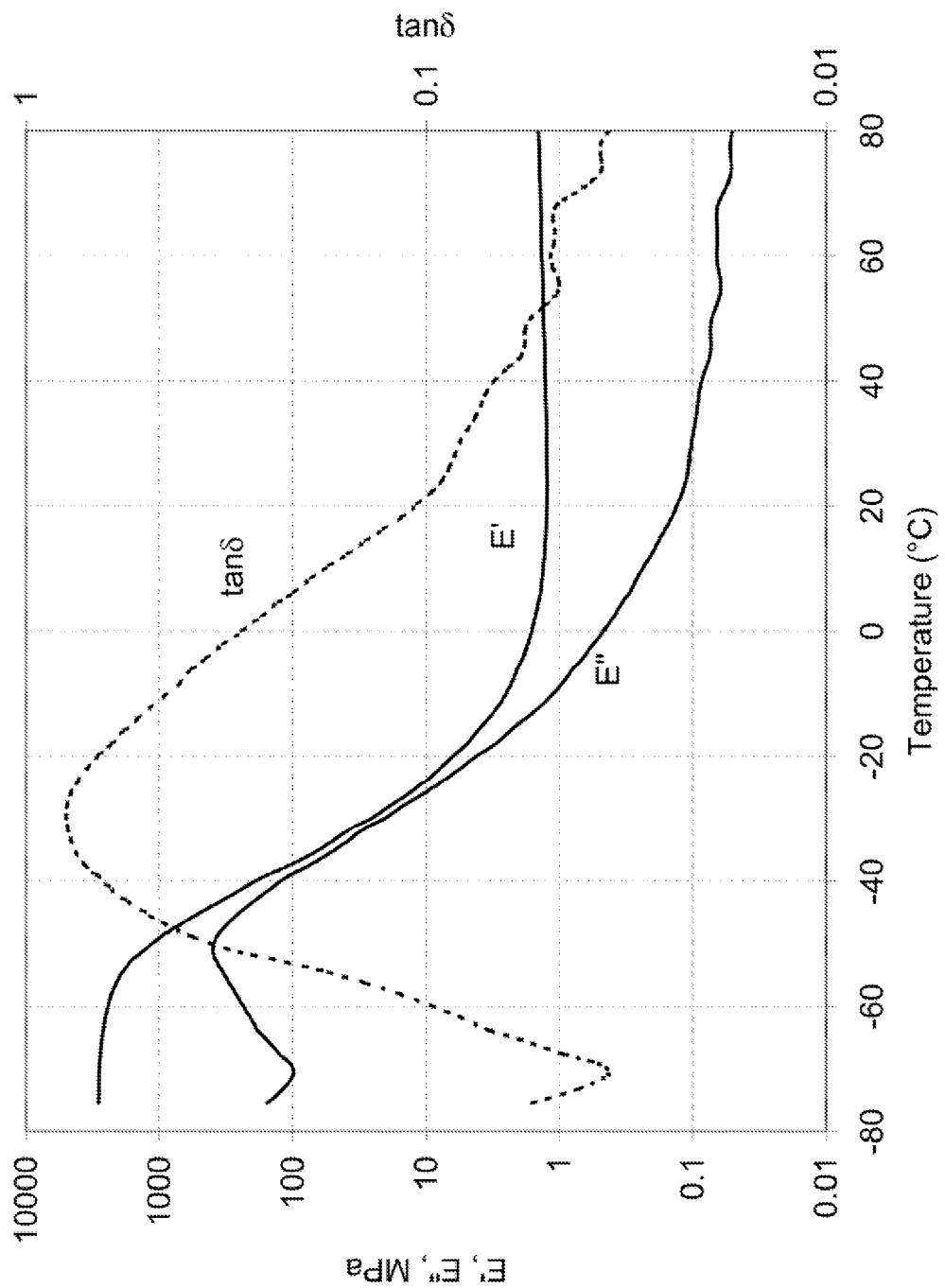
FIG. 3 depicts the dynamic mechanical properties of a typical commercial primary coating (i.e., a conventional primary coating).
Figure 4:
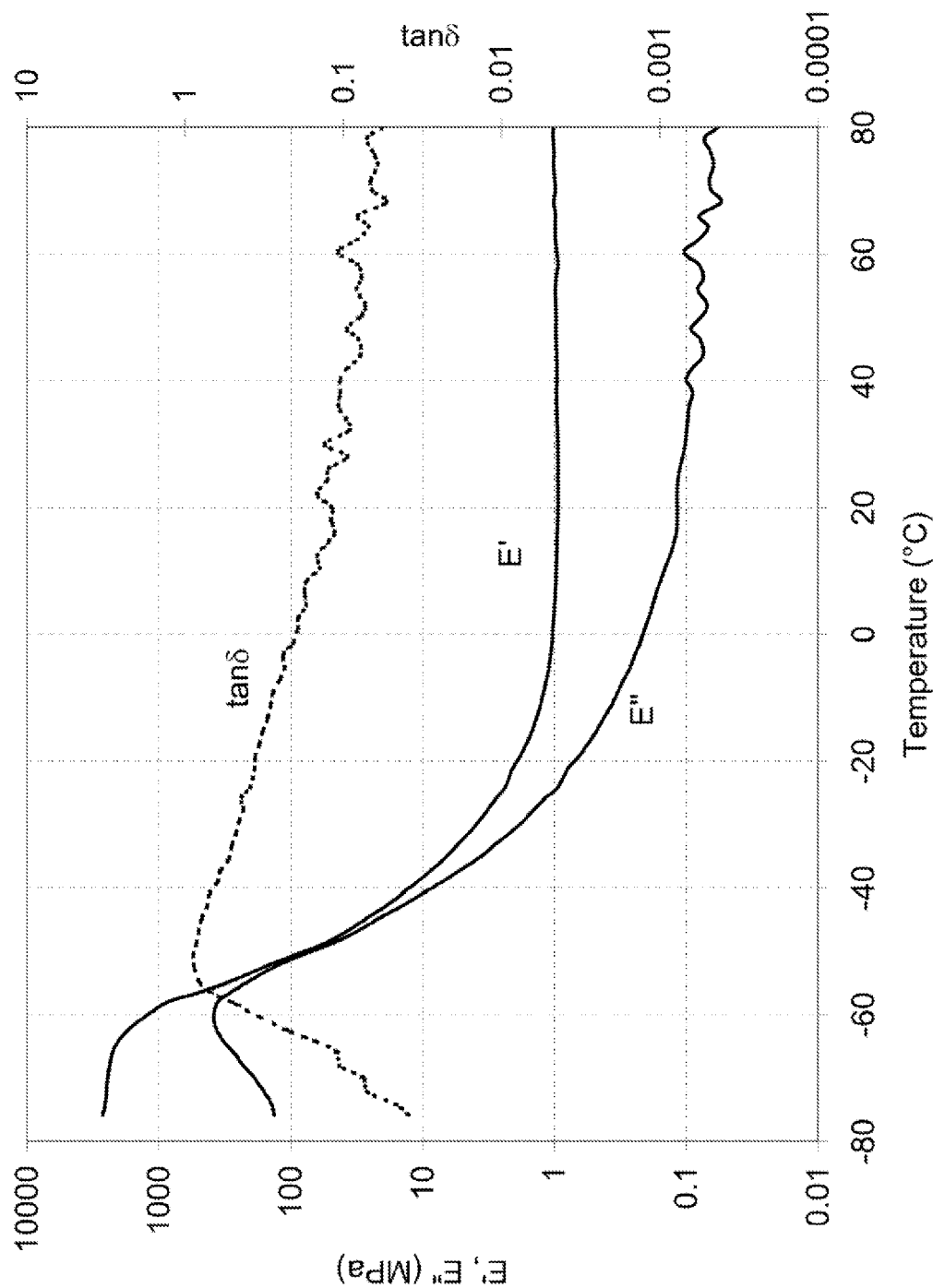
FIG. 4 depicts the dynamic mechanical properties of an exemplary primary coating used in producing optical fibers according to the present invention.

FIGS. 3 and 4, respectively, depict dynamic mechanical properties of a typical commercial primary coating (i.e., the conventional primary coating) and an exemplary primary coating used in making the optical fibers according to the present invention. The conventional primary coating was a UV-curable urethane acrylate provided by DSM Desotech (Elgin, Ill.) under the trade name DeSolite® DP 1007. The exemplary primary coating according to the present invention (i.e., employed to form optical fibers of the present invention) was a UV-curable urethane acrylate provided by DSM Desotech (Elgin, Ill.) under the trade name DeSolite® DP 1011.

The data for the conventional primary coating were obtained on a Dynamic Mechanical Analyzer (DMA) at an oscillatory stress rate of 1 Hz. In doing so, the strain was maintained within the linear region of stress-strain behavior. The sample of conventional primary coating was cured on polyester to form a standard 75-micron film. A UV dose of 1 J/cm$^2$ was applied using a mercury-halide bulb operating at a 300 W/in output. This UV exposure was sufficient to ensure that the coating was on the plateau of the dose-modulus curve.

Referring to FIG. 3, the data show the equilibrium modulus to be approximately 1.5 MPa as measured on a 75-micron film. On a glass fiber (i.e., in situ), this conventional primary coating typically cures well to a modulus of about 0.8 MPa, a level indicative of many single-mode fiber primary coatings in the industry. Those having ordinary skill in the art will appreciate that modulus measurements of softer primary coatings tend to be lower on a glass fiber (i.e., in situ) as compared with on a 75-micron film.

The glass transition temperature of the conventional primary coating is estimated by the peak in tan $\delta$ to be approximately −30° C. Thus, the conventional primary coating (and similar formulations) will behave like a glassy polymer at extremely low temperatures (e.g., less than −40° C., particularly less than −50° C.). (Although stress induced by strain is time dependent at low temperatures, estimated glass transition temperature is a useful comparative property.)

A sample of the exemplary primary coating according to the present invention was likewise cured on polyester to form a comparable 75-micron film. As before, a UV dose of 1 J/cm$^2$ was applied to the primary coating using a mercury-halide bulb operating at a 300 W/in output. As noted, FIG. 4 depicts dynamic mechanical properties of the exemplary primary coating according to the present invention.

The exemplary primary coating according to the present invention exhibited an equilibrium modulus at just under 1 MPa in the cured film. The in situ modulus (i.e., measured on the glass fiber), was between about 0.3 MPa and 0.4 MPa. This is significantly lower than the respective modulus measurements for the conventional primary coating.

The glass transition temperature of the exemplary primary coating according to the present invention is estimated by the peak in tan $\delta$ at less than about −50° C. (e.g., about −60° C.). This is at least about 20° C. below the glass transition temperature of the comparative, conventional primary coating. Accordingly, primary coatings according to the present invention provide much more rapid stress relaxation during temperature excursions.

As set forth in Examples 2 and 3 (below), two different methods were used to evaluate the respective microbend sensitivities of glass fibers coated with (i) a typical commercial primary coating (i.e., the conventional primary coating) and (ii) an exemplary primary coating according to the present invention. As with Example 1 (above), the conventional primary coating was a UV-curable urethane acrylate provided by DSM Desotech (Elgin, Ill.) under the trade name DeSolite® DP 1007, and the exemplary primary coating according to the present invention (i.e., employed to form optical fibers of the present invention) was a UV-curable urethane acrylate provided by DSM Desotech (Elgin, Ill.) under the trade name DeSolite® DP 1011.

Each test method provided aggravated lateral stress conditions. Moreover, after measuring the effect on attenuation at room temperature, the test structures were temperature cycled to determine the additional loss induced by such temperature excursions.

Example 2

Comparison of Microbending Sensitivity

The first test method employed was a basket-weave, temperature cycling procedure known by those having ordinary skill in the art. According to this test procedure, optical fiber was wound at about 490 mN (i.e., a tension of 50 gf on a 300-mm diameter quartz cylinder with a 9-mm "lay"). Fifty layers were wound on the quartz drum to create numerous fiber-to-fiber crossovers. The testing procedure for Example 2 was an adaptation of IEC TR62221, Method D, which, as noted, is incorporated by reference in its entirety.

Those having ordinary skill in the art will appreciate that, at room temperature, such fiber crossovers can sometimes cause added loss (i.e., if the optical fiber is very sensitive) but that typically little or no added loss is observed. Consequently, the drum (with wound fiber) was temperature cycled twice from about room temperature through (i) −40° C., (ii) −60° C., (iii)+70° C., and (iv)+23° C. (i.e., near room temperature) while making loss measurements at 1550 nanometers. In both temperature cycles, fiber attenuation was measured after one hour at each test temperature.

Figure 5:
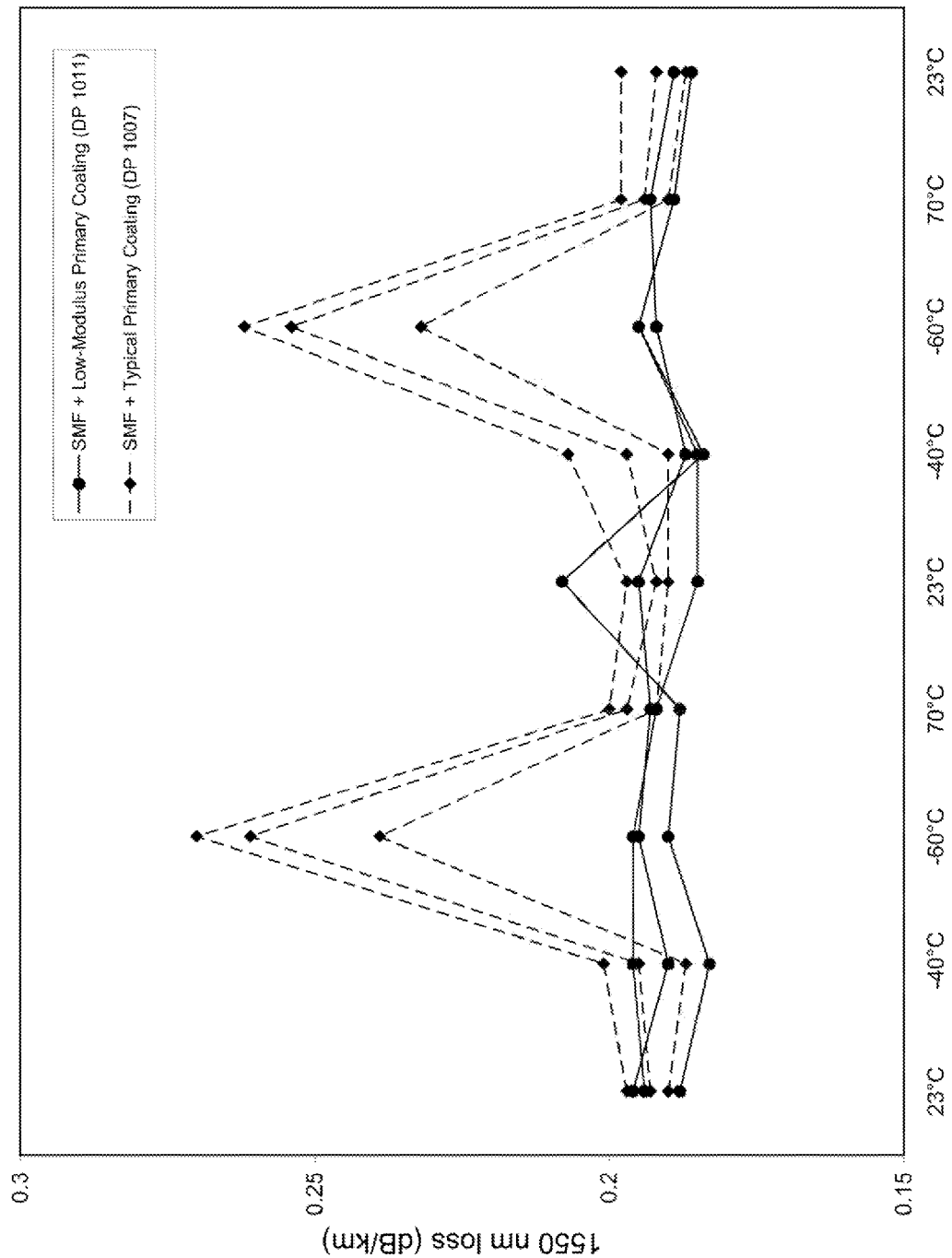
FIG. 5 depicts microbend testing results for optical fibers that include a conventional primary coating and for optical fibers that include an exemplary primary coating according to the present invention.

FIG. 5 depicts exemplary results for single-mode glass fibers coated with, respectively, a conventional primary coating (i.e., DeSolite® DP 1007) and an exemplary primary coating according to the present invention (i.e., DeSolite® DP 1011). The respective fiber specimens were chosen to match the coating geometry, mode field diameter, and cutoff wavelength. Accordingly, the respective optical fibers employed different formulations of colored secondary coatings.

In summary, the conventional primary coating and the exemplary primary coating according to the present invention each provided good protection against microbending stresses at 23° C. Moreover, at −40° C., the optical fiber having the conventional primary coating demonstrated only a small added loss. (It would appear that at −40° C., the conventional primary coating provided adequate protection against microbending by stress relaxing in a reasonable timeframe, even though this was near its glass transition temperature.) By way of comparison, the optical fiber according to the present invention demonstrated essentially no added loss at −40° C. (i.e., better performance).

At −60° C., however, the optical fiber having the conventional primary coating demonstrated significant added loss. (This temperature extreme was well below the glass transition temperature of the conventional primary coating.) By way of comparison, the optical fiber according to the present invention demonstrated essentially no added loss at −60° C., which is close to the glass transition temperature of this embodiment of the primary coating according to the present invention.

Example 3

Comparison of Microbending Sensitivity

The second test method employed more aggressive environments (i.e., conditions) in order to evaluate the respective microbend sensitivities of (i) an optical fiber possessing a typical commercial primary coating (i.e., the conventional primary coating) and (ii) an optical fiber possessing an exemplary primary coating according to the present invention.

In particular, the second method modified the IEC fixed-diameter sandpaper drum test (i.e., IEC TR62221, Method B), which, as noted, is incorporated by reference in its entirety, to provide a microbending stress situation sufficiently harsh to affect single-mode fibers even at room temperature (i.e., a rougher drum surface than that used to measure the data depicted in FIG. 1). To do this, a 300-mm diameter quartz drum was wrapped with adhesive-backed, 220-grit sandpaper (i.e., approximately equivalent to 66-micron-grade sandpaper) to create a rough surface.

In an initial test condition, each of the respective fiber samples was wound in a single layer at about 980 mN (i.e., a tension of 100 gf on a 300-mm diameter quartz cylinder). In a modified test condition, three (3) each of the respective fiber samples was wound in a single layer at about 1,470 mN (i.e., a tension of 150 gf on a 300-mm diameter quartz cylinder). Thus, as compared with the first test condition, the second test condition increased the winding tension by 50 percent.

Using matched fiber samples (as with the basket weave/temperature cycling test of Example 2) fiber attenuation was measured after winding at room temperature (i.e., 23° C.) for each test condition. Then, the drum (with 400 meters of wound fiber) was temperature cycled from about room temperature through (i) −40° C., (ii) −60° C., and (iii)+23° C. (i.e., near room temperature) while making loss measurements at 1550 nanometers using an optical time domain reflectometer (OTDR).

The several samples of each kind of optical fiber were initially measured at 23° C. on the original spools (i.e., before winding on the roughened drum surface to establish baseline spectral attenuation) then were subjected to the foregoing rigorous testing conditions for one hour at each temperature. Fiber attenuation was measured after one hour (as in Example 2) at each test temperature.

Figure 6:
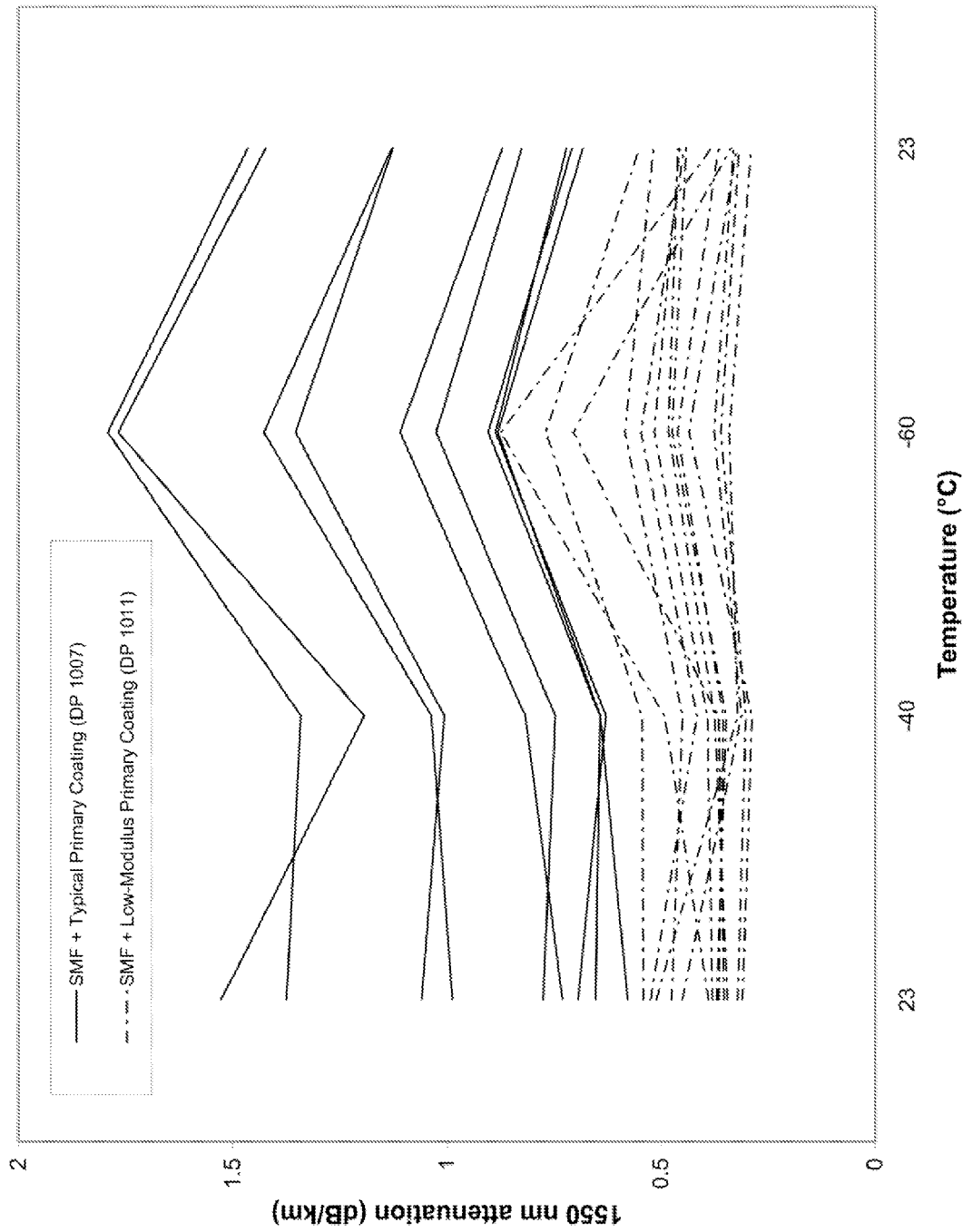
FIG. 6 depicts microbend testing results (under rigorous temperature-cycle testing conditions) for optical fibers that include a conventional primary coating and for optical fibers that include an exemplary primary coating according to the present invention.
Figure 7:
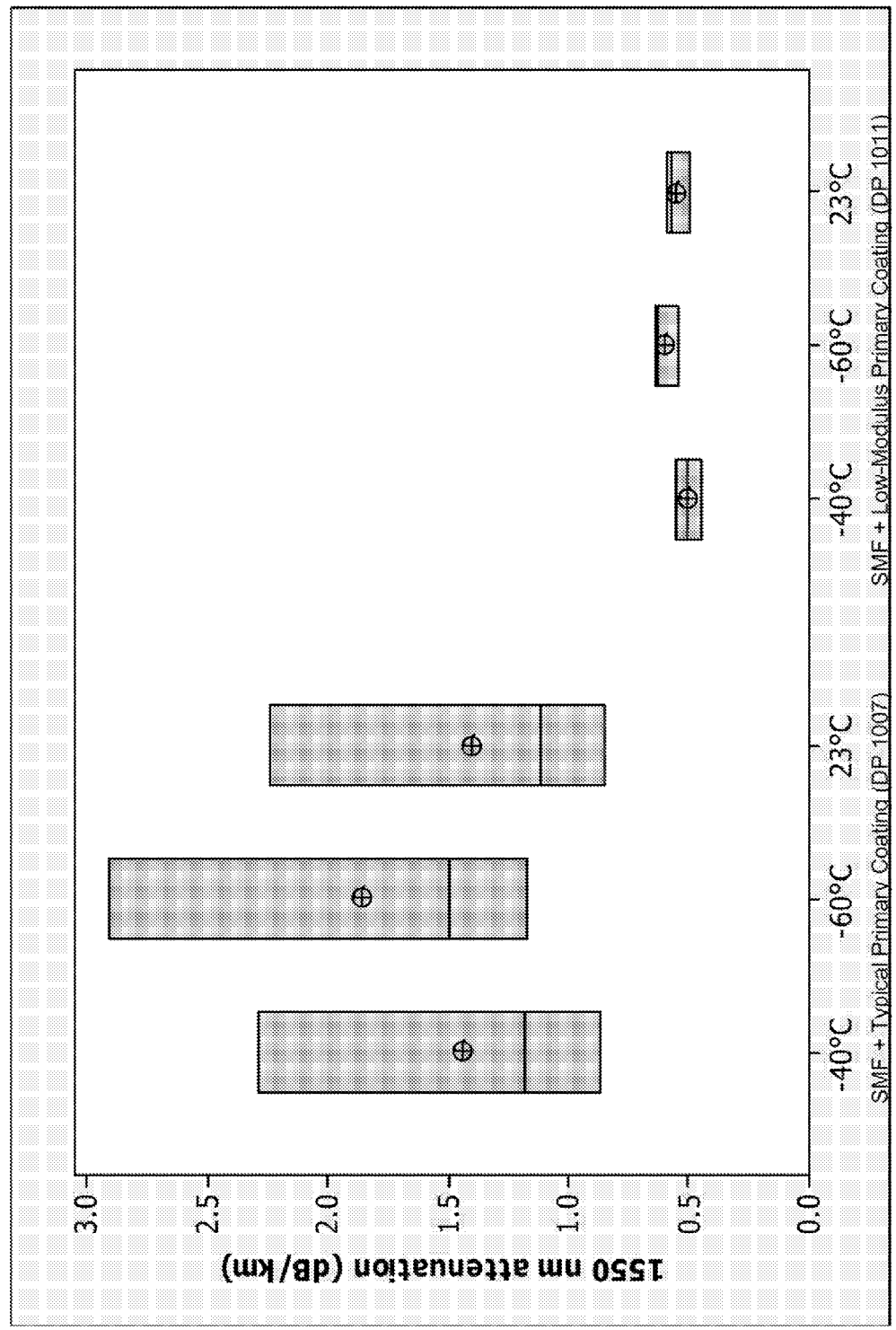
FIG. 7 depicts microbend testing results (under modified temperature-cycle testing conditions) for optical fibers that include a conventional primary coating and for optical fibers that include an exemplary primary coating according to the present invention.

FIG. 6, a line chart, and FIG. 7, a box plot, depict exemplary results under these more rigorous testing conditions for single-mode optical fibers that include a conventional primary coating (i.e., DeSolite® DP 1007 UV-curable urethane acrylate) and for single-mode optical fibers that include an exemplary primary coating according to the present invention (i.e., DeSolite® DP 1011 UV-curable urethane acrylate).

FIG. 6, for instance, shows that, as compared with conventional optical fibers, exemplary optical fibers according to the present invention possess reduced microbend sensitivity (i.e., a reduction of about 40-60 percent).

Likewise, FIG. 7 shows that, as compared with conventional optical fibers, exemplary optical fibers according to the present invention possess substantially reduced microbend sensitivity at a higher winding tension (i.e., 150 gf on a 300-mm diameter quartz cylinder). FIG. 7 thus illustrates that the exemplary primary coating according to the present invention (i.e., DeSolite® DP 1011 UV-curable urethane acrylate) promotes both significantly reduced and significantly more uniform microbending performance.

In accordance with the foregoing, it has been found that, as compared with a conventional coating system, the present coating system provides significant microbending improvement when used in combination with a conventional single-mode glass fiber.

It has been further found that pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses. Additional testing was performed, therefore, to demonstrate the dramatic and unexpected reductions in microbend sensitivity provided in accordance with the present invention.

Example 4

Comparison of Microbending Sensitivity

The respective microbend sensitivities were measured for exemplary optical fibers, including (i) a conventional single-mode glass fiber with a conventional commercial coating, (ii) a bend-insensitive glass fiber with a conventional commercial coating, and (iii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 8:
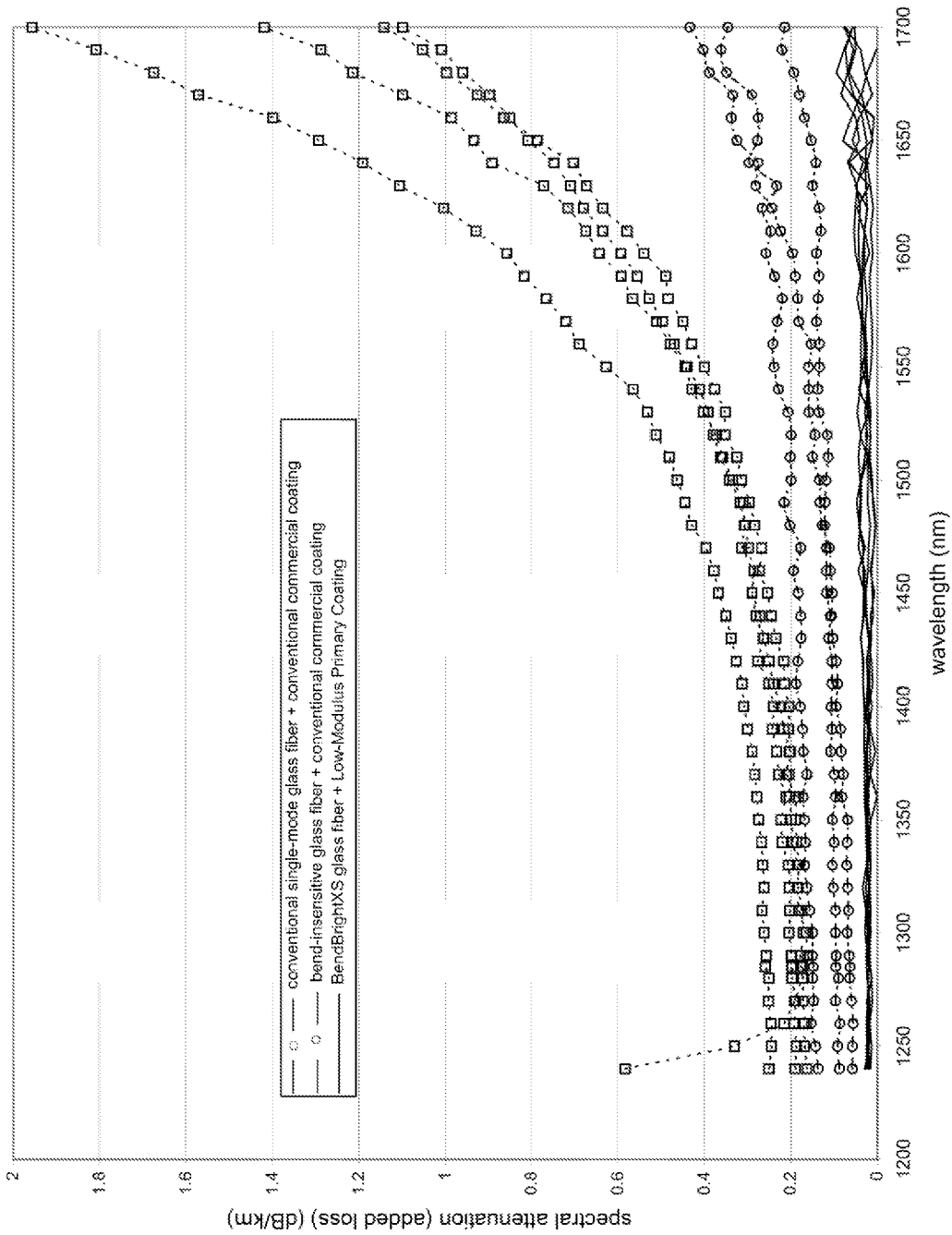
FIG. 8 depicts microbend testing results demonstrating that exceptionally low microbending losses are achieved, in accordance with the present invention, by pairing a bend-insensitive glass fiber with a low-modulus primary coating.

FIG. 8 demonstrates that the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides exceptionally low attenuation losses as compared with other optical fibers. Moreover, this bend-resistant optical fiber exhibits small wavelength dependence within the transmission window between 1400 nanometers and 1700 nanometers, and is essentially unaffected by the microbend-inducing test conditions across the test spectrum.

FIG. 8 presents exemplary spectral attenuation data obtained adhering to IEC TR62221, Method B (fixed-diameter drum). In accordance with IEC TR62221, Method B, initial spectral attenuation was measured on a 440-meter sample of optical fiber wound on a shipping spool (i.e., obtaining the peaks and valleys typical of the attenuation across the full spectrum of wavelengths between the limits shown). The optical fiber was then wound at about 3 N onto a 300-mm diameter measurement spool wrapped with adhesive-backed, 40-micron grade sandpaper (i.e., approximately equivalent to 300-grit sandpaper), and another spectral attenuation curve was obtained.

Like the curves presented in FIG. 1, the curves depicted in FIG. 8 represent, at 23° C., the difference between the initial spectral curve and the curve when the fiber is on the sandpaper drum of fixed diameter, thereby providing the added loss due to microbending stresses (i.e., delta-attenuation across the spectral range).

Example 5

Comparison of Microbending Sensitivity

The respective microbend sensitivities were measured under rigorous test conditions for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 9:
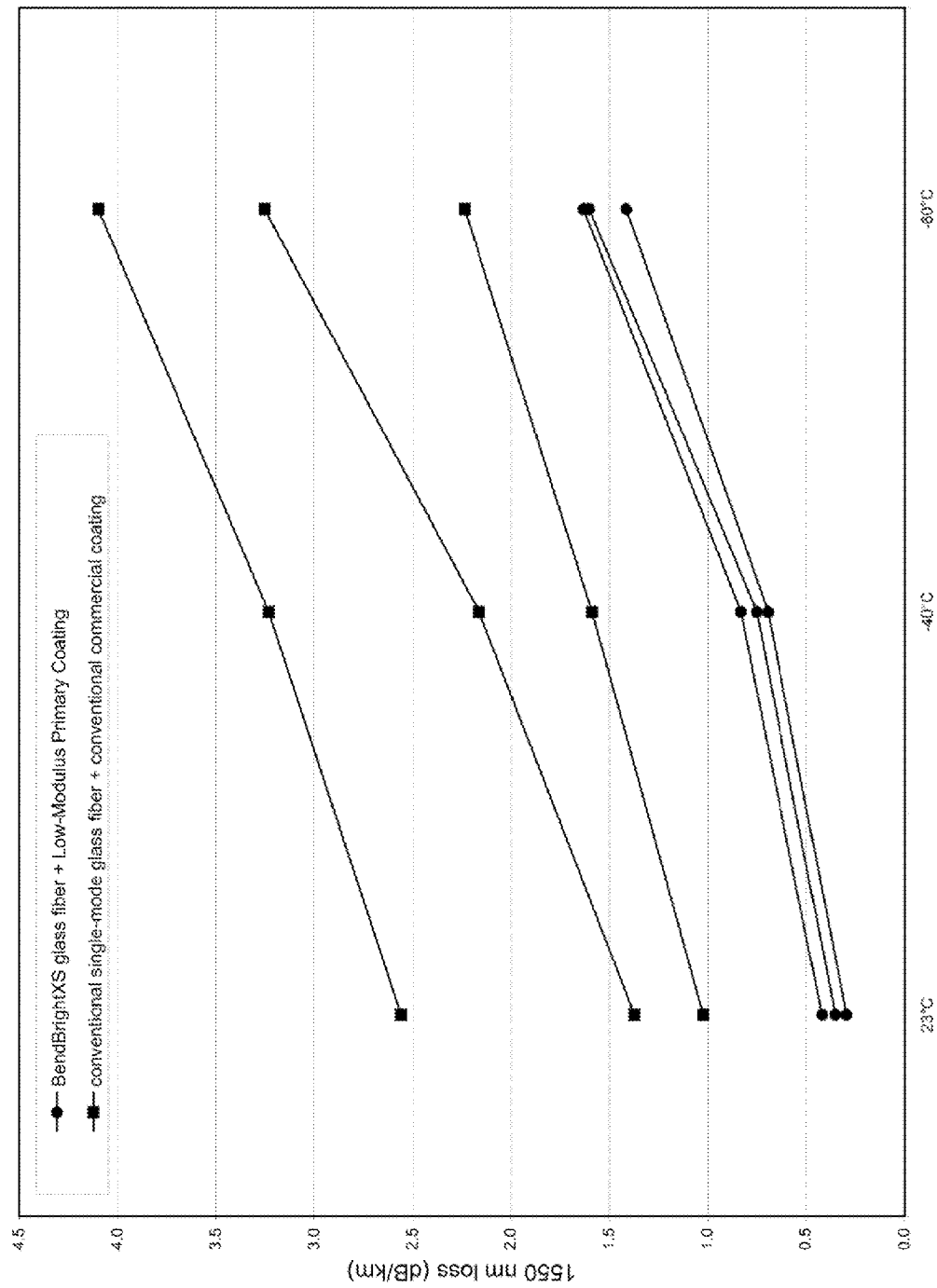
FIG. 9 depicts microbend testing results (under rigorous temperature-cycle testing conditions) for conventional optical fibers and for optical fibers that, in accordance with the present invention, combine a bend-insensitive glass fiber with a low-modulus primary coating.

FIG. 9 demonstrates that, even under extremely harsh conditions, the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides surprisingly low attenuation losses as compared with other optical fibers.

The testing procedure for Example 5 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 180-grit sandpaper (i.e., approximately equivalent to 78-micron-grade sandpaper) to create an even rougher surface than that described in Example 3 (above). Then, 440-meter fiber samples were wound in a single layer at about 1,470 mN (i.e., a controlled back tension of 150 gf on the 300-mm diameter quartz cylinder using a Delachaux optical fiber winding apparatus), and spectral attenuation was measured.

FIG. 9 presents exemplary temperature-cycle data for three specimens of standard single-mode fiber (i.e., a conventional single-mode glass fiber with a conventional commercial coating) and three specimens of optical fiber according to the present invention (i.e., a bend-insensitive glass fiber with improved coating according to the present invention). As noted, 440 meters of optical fiber is wound onto the aforementioned sandpaper-covered, fixed-diameter drum. One hour after winding, fiber attenuation was measured at room temperature (i.e., 23° C.) using an optical time domain reflectometer (OTDR). Then, the drum (with 440 meters of wound fiber) was temperature cycled from about room temperature through (i) −40° C. and (ii) −60° C. in a temperature-controlled chamber. Fiber attenuation at 1550 nanometers was measured by an OTDR after one hour of equilibration at both −40° C. and −60° C.

Microbending sensitivity (Sm) may be described as $\alpha R/T$, wherein $\alpha$ is the attenuation increase on the drum (dB/km), R is the radius of the fixed drum (mm), and T is the winding tension applied to the fiber (N). See e.g., IEC TR62221 Technical Report (Microbending Sensitivity). In addition to the parameters $\alpha$, R, and T, however, the microbending-sensitivity metric obtained from the fixed-diameter sandpaper drum test is dependent on the coarseness of the sandpaper employed on the measurement drum.

Table 1 (below) presents the microbending-sensitivity metric obtained from the attenuation data (at a wavelength of 1550 nanometers) depicted in FIG. 9 (i.e., employing 180-grit sandpaper). Table 1 shows that, as compared with a conventional standard single-mode fiber, the optical fiber according to the present invention provides microbending sensitivity that is about 2×-10× lower at 23° C. and about 2×-5× lower at −40° C.:

TABLE 1

(Microbend Sensitivity)

| Optical Fiber (Coating Color) | 23° C. (dB/km)/ (N/mm) | −40° C. (dB/km)/ (N/mm) | −60° C. (dB/km)/ (N/mm) |
| --- | --- | --- | --- |
| Conventional SMF (blue) | 139.9 | 220.6 | 331.8 |
| Conventional SMF (red) | 261.0 | 329.7 | 417.9 |
| Conventional SMF (aqua) | 104.3 | 161.9 | 228.0 |
| BendBright$^{XS}$ ® w/ ColorLock$^{XS}$ (slate) | 35.8 | 76.5 | 163.4 |
| BendBright$^{XS}$ ® w/ ColorLock$^{XS}$ (red) | 30.1 | 70.6 | 144.2 |
| BendBright$^{XS}$ ® w/ ColorLock$^{XS}$ (aqua) | 42.7 | 84.7 | 166.4 |

Example 6

Comparison of Microbending Sensitivity

The respective microbend sensitivities were further measured for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

The testing procedure for Example 6 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 220-grit sandpaper (i.e., approximately equivalent to 66-micron-grade sandpaper) to create a rough surface like that described in Example 3. Each of the fiber samples was wound in a single layer at about 1,470 mN (i.e., a tension of 150 gf on a 300-mm diameter quartz cylinder). As compared with the test conditions of Example 5, the test conditions of Example 6 employed finer grade sandpaper (i.e., 220-grit rather than 180-grit).

As in Example 3, using matched fiber samples, fiber attenuation was measured after winding at room temperature (i.e., 23° C.). Then, the drum (with about 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

Three (3) samples of each kind of optical fiber were initially measured at 23° C. on the original spools (i.e., before winding on the roughened drum surface to establish baseline spectral attenuation) and then were subjected to the foregoing rigorous testing conditions for one hour at each temperature. Fiber attenuation was measured after one hour at each temperature.

Figure 10:
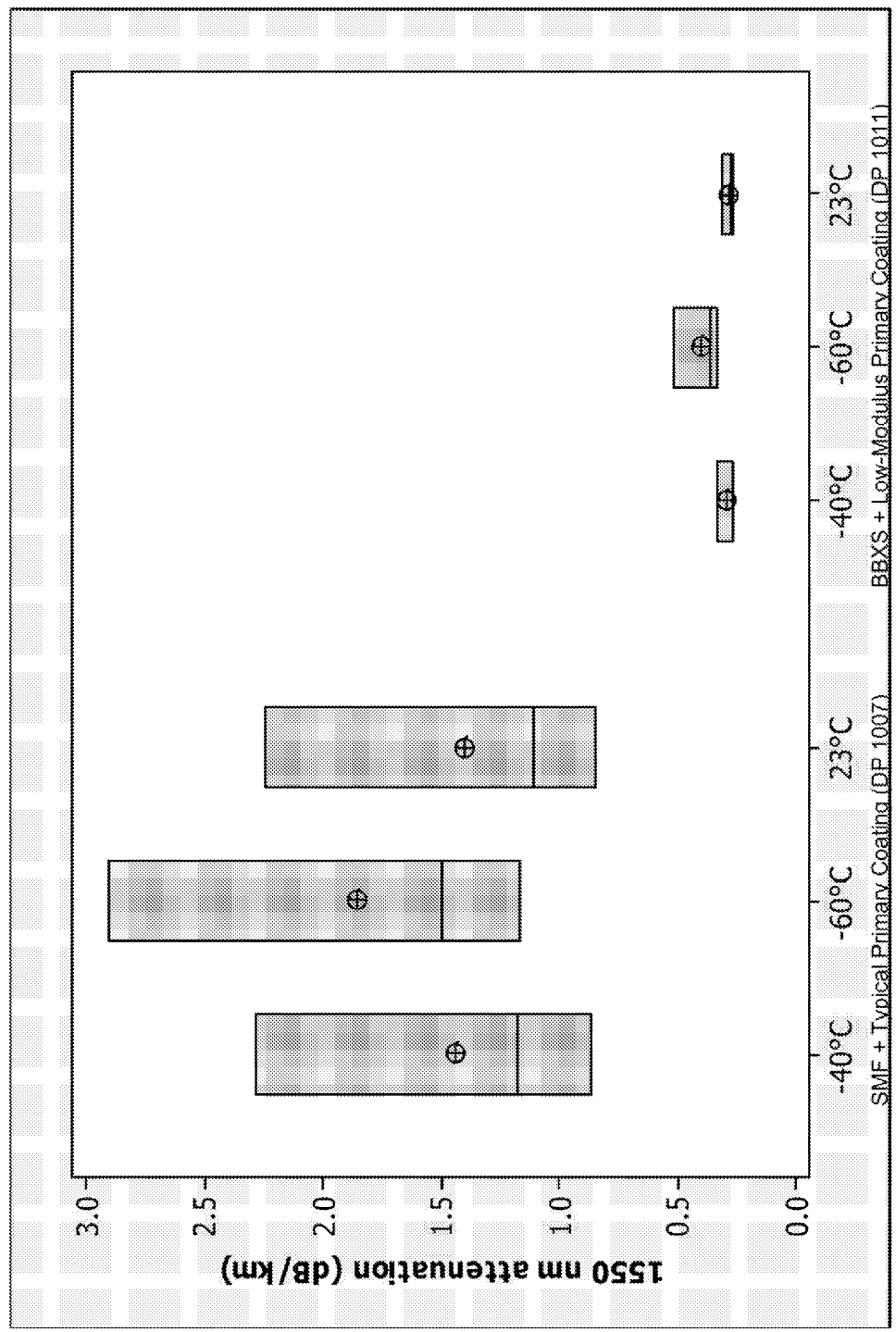
FIG. 10 depicts microbend testing results (under modified temperature-cycle testing conditions) for conventional optical fibers and for optical fibers that, in accordance with the present invention, combine a bend-insensitive glass fiber with a low-modulus primary coating.

FIG. 10 depicts exemplary results for single-mode optical fibers that include a conventional primary coating (i.e., DeSolite® DP 1007 UV-curable urethane acrylate) and for bend-insensitive glass fibers (e.g., Draka Comteq's single-mode glass fibers available under the trade name BendBright$^{XS}$®) that include a primary coating having very low modulus (i.e., DSM Desotech's UV-curable urethane acrylate product provided under the trade name DeSolite® DP 1011).

FIG. 10 demonstrates that the optical fiber according to the present invention, namely Draka Comteq's single-mode glass fibers available under the trade name BendBright$^{XS}$® with a primary coating having very low modulus (e.g., DSM Desotech's UV-curable urethane acrylate product provided under the trade name DeSolite® DP 1011), provides exceptionally low attenuation losses as compared with standard single-mode optical fibers (SSMF).

Figure 11:
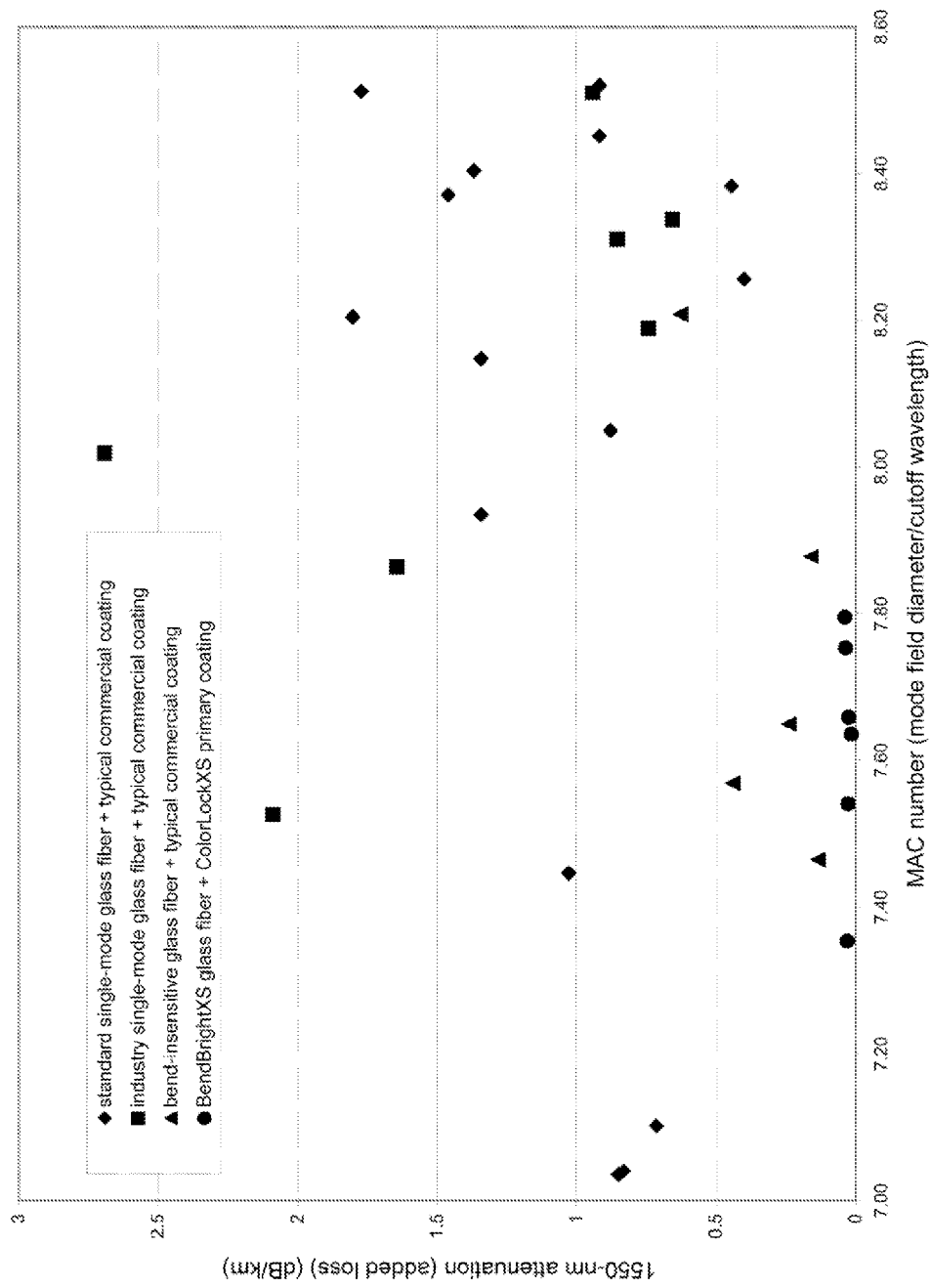
FIG. 11 depicts attenuation (added loss) as a function of MAC number (i.e., mode field diameter divided by cutoff wavelength) for various exemplary optical fibers.
Figure 12:
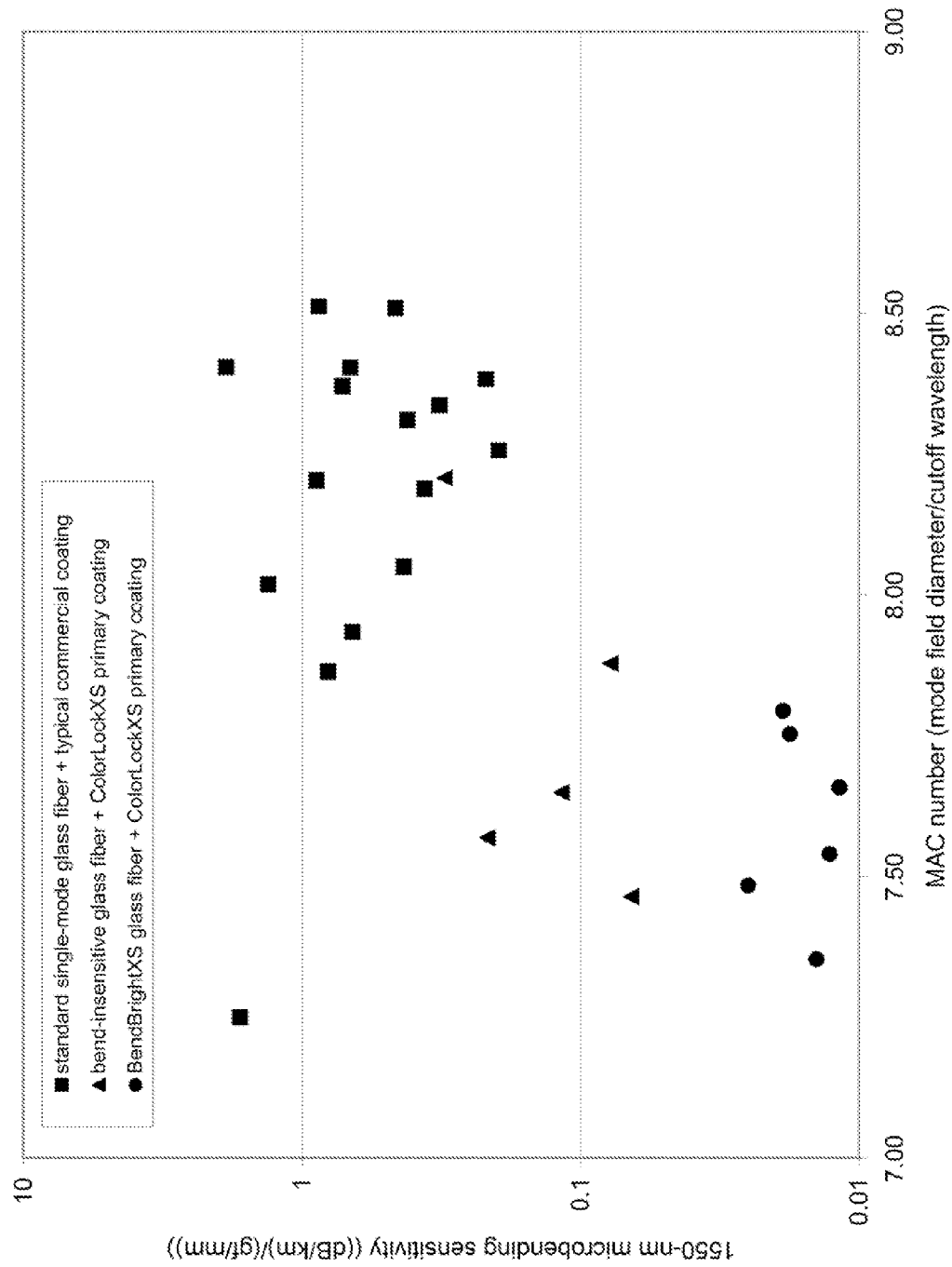
FIG. 12 depicts, on a logarithmic scale, microbend sensitivity as a function of MAC number (i.e., mode field diameter divided by cutoff wavelength) for various exemplary optical fibers.

In addition, FIGS. 11 and 12 depict attenuation and microbend sensitivity, respectively, at a wavelength of 1550 nanometers as a function of MAC number (i.e., mode field diameter divided by cutoff wavelength) for various exemplary optical fibers in accordance with the standard IEC fixed-diameter sandpaper drum test (i.e., IEC TR62221, Method B). The respective attenuation data depicted in FIG. 11 (added loss) and FIG. 12 (microbend sensitivity) were obtained at 23° C. under the test conditions previously described with respect to FIG. 1 (i.e., 400-meter fiber samples were wound at about 2,940 mN (i.e., a tension of 300 gf) on a 300-mm diameter fiber spool wrapped with adhesive-backed, 40-micron grade sandpaper).

FIG. 11 shows that Draka Comteq's bend-resistant, single-mode glass fiber available under the trade name Bend-Bright$^{XS}$® in combination with Draka Comteq's Color-Lock$^{XS}$ brand coating system provides outstanding performance with respect to added loss.

FIG. 12 shows that Draka Comteq's bend-resistant, single-mode glass fiber available under the trade name Bend-Bright$^{XS}$® in combination with Draka Comteq's Color-Lock$^{XS}$ brand coating system provides superior microbend sensitivity (i.e., microbend sensitivity of 0.01 to 0.03 (dB/km)/(gf/mm)).

The optical fibers according to the present invention typically further include a tough secondary coating to protect the primary coating and glass fiber from damage during handling and installation. For example, the secondary coating might have a modulus of between about 800 MPa and 1,000 MPa (e.g., about 900 MPa) as measured on a standard 75-micron film. As disclosed herein, this secondary coating may be inked as a color code or, preferably, may be color-inclusive to provide identification without the need for a separate inking process.

In one embodiment according to the present invention, the secondary coating, which surrounds the primary coating to thereby protect the fiber structure, features an inclusive coloring system (i.e., not requiring an extra layer of ink to be added for color coding). The colors, which conform to Munsell standards for optical fiber color-coding, are enhanced for brightness and visibility under dim lighting (e.g., in deep shade or in confined spaces, such as manholes) and are easily distinguished against both light and dark backgrounds.

Furthermore, the secondary coating features a surface that provides an excellent interface with ribbon matrix material so that the matrix separates easily from the colored fiber in a way that does not sacrifice robustness. The mechanical properties of the colored secondary coating are balanced with those of the primary coating so that, in heat stripping, the coating/matrix composite separates cleanly from the glass fibers.

Employing Draka Comteq's bend-resistant, single-mode glass fiber available under the trade name BendBright$^{XS}$® (or the trade name BendBright-Elite™) with the present dual-coating system, which includes a low-modulus primary coating, has been found to reduce microbending sensitivity by between about one to two orders of magnitude relative to standard single-mode fiber (SSMF) at the key transmission frequencies of 1550 nanometers and 1625 nanometers. As noted, such optical fiber not only provides outstanding resistance to microbending and macrobending, but also complies with the ITU-T G.657.A/B and ITU-T G.652.D requirements.

In particular, Draka Comteq's bend-resistant, single-mode glass fiber available under the trade name BendBright$^{XS}$® (e.g., enhanced with Draka Comteq's ColorLock$^{XS}$ brand coating system) provides resistance to macrobending required for sustained bends having a radius as low as five (5) millimeters with an estimated failure probability of less than two (2) breaks per million full-circle bends (i.e., 360°) over 30 years in a properly protected environment. These bend-resistant optical fibers facilitate the rapid deployment of small, flexible cables for the delivery of fiber to the premises/business/home (i.e., FTTx) by virtue of the optical fiber's ability to sustain a loss-free transmission through small-radius bends. Cables employing such bend-resistant optical fibers may be routed around sharp bends, stapled to building frame, coiled, and otherwise employed in demanding environments while retaining clear and strong signal transmission.

In another aspect, the bend-insensitive optical fibers according to the present invention facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the optical fiber according to the present invention, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber according to the present invention may include an outermost ink layer, which is typically between two and ten microns in thickness.

In one alternative embodiment, an optical fiber according to the present invention may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

In such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns). Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

One exemplary optical-fiber embodiment employs a secondary coating of about 197 microns at a tolerance of +/−5 microns (i.e., a secondary-coating outer diameter of between 192 microns and 202 microns). Typically, the secondary coating will retain a thickness of at least about 10 microns (e.g., an optical fiber having a reduced-thickness secondary coating of between 15 microns and 25 microns).

In accordance with the foregoing, a particular reduced-diameter, optical-fiber embodiment having exceptionally low losses employs Draka Comteq's 125-micron single-mode glass fiber available under the trade name BendBright$^{XS}$® with a 155-micron-diameter, low-modulus primary coating layer (e.g., Draka Comteq's ColorLock$^{XS}$ brand coating system) and a secondary coating (e.g., a nominal 200-micron-diameter secondary coating). As noted, BendBright$^{XS}$® bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

Another particular reduced-diameter, optical-fiber embodiment having exceptionally low losses employs Draka Comteq's 125-micron single-mode glass fiber available under the trade name BendBright-Elite™ with a 155-micron-diameter, low-modulus primary coating layer (e.g., Draka Comteq's ColorLock$^{XS}$ brand coating system) and a secondary coating (e.g., a nominal 200-micron-diameter secondary coating). Like BendBright$^{XS}$® bend-insensitive optical fiber, BendBright-Elite™ bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

The synergistic combination of (i) Draka Comteq's BendBright$^{XS}$® bend-insensitive single-mode glass fiber (or Draka Comteq's BendBright-Elite™ bend-insensitive glass fiber) and (ii) Draka Comteq's ColorLock$^{XS}$ brand coating system promotes significant reductions in optical-fiber diameter.

By way of example, Draka Comteq's 125-micron BendBright$^{XS}$® bend-insensitive single-mode glass fiber in combination with a 155-micron-diameter, low-modulus primary coating layer (e.g., Draka Comteq's ColorLock$^{XS}$ brand coating system) and a 200-micron-diameter secondary coating layer provides (i) comparable microbending performance to that of a 125-micron, standard single-mode glass fiber coated with a 185-micron-diameter, low-modulus primary coating layer (e.g., Draka Comteq's ColorLock$^{XS}$ brand coating system) and a 242-micron-diameter secondary coating layer and (ii) significantly better microbending performance than that of a standard single-mode optical fiber (SSMF) that employs conventional primary and secondary coatings (i.e., at an outer diameter of about 235-265 microns).

As noted previously, one suitable composition for the primary coating is a UV-curable urethane acrylate product provided by DSM Desotech (Elgin, Ill.) under the trade name DeSolite® DP 1011. It is believed that this UV-curable urethane acrylate product includes about 1.0 percent of adhesion promoter. Other suitable compositions for the primary coating include alternative UV-curable urethane acrylate products provided by DSM Desotech under various trade names, including DeSolite® DP 1014, DeSolite® DP 1014XS, and DeSolite® DP 1016. It is believed that these alternative compositions possess essentially the same low-modulus and glass-transition properties as those possessed by the aforementioned DeSolite® DP 1011 UV-curable urethane acrylate product, albeit with some compositional variation (e.g., adhesion promoter concentration increased to 1.25 percent). As will be appreciated by those having ordinary skill in the art, compositional variations may provide particular primary-coating properties that are desirable for particular applications. It appears that the DeSolite® DP 1014XS UV-curable urethane acrylate product, for instance, exhibits favorable processing characteristics and provides improved delamination resistance.

Those having ordinary skill in the art will appreciate that each of these exemplary UV-curable urethane acrylate products (i.e., DeSolite® DP 1011, DeSolite® DP 1014, DeSolite® DP 1014XS, and DeSolite® DP 1016) provides better microbending performance than do conventional primary coatings, such as other UV-curable urethane acrylate products provided by DSM Desotech under the respective trade names DeSolite® DP 1004 and DeSolite® DP 1007.

Example 7

Comparison of Microbending Sensitivity

The respective microbend sensitivities were further measured for exemplary optical fibers, including (i) an enhanced single-mode glass fiber (ESMF) with a low-modulus coating, (ii) various bend-insensitive glass fibers (e.g., Draka Comteq's single-mode glass fibers available under the trade names BendBright$^{XS}$®) with conventional primary coatings, and (iii) various bend-insensitive glass fibers and macrobend-resistant glass fibers (e.g., Draka Comteq's single-mode glass fibers available under the trade names BendBright$^{XS}$® and BendBright®) with low-modulus primary coatings.

The testing procedure for Example 7 was an adaptation of IEC TR62221, Method B, which, as noted, is incorporated by reference in its entirety. For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface—albeit a finer surface than the surfaces employed in Examples 3-6. Then, each 440-meter fiber sample was wound in a single layer at about 1,470 mN (i.e., a controlled tension of 150 gf on the 300-millimeter diameter quartz drum using a Delachaux optical fiber winding apparatus). For the sake of convenience, this particular modification of the IEC TR62221, Method B, is herein referred to as the "Reduced-Diameter Optical-Fiber Microbend Sensitivity Test."

Two hours after winding, fiber attenuation was measured at room temperature (i.e., 23° C.) using an optical time domain reflectometer (OTDR). Then, the drum (with 440 meters of wound fiber) was temperature cycled in a temperature-controlled chamber from about room temperature through (i) −40° C. and (ii) −60° C. Fiber attenuation was measured by an optical time domain reflectometer (OTDR) after two hours of equilibration at both −40° C. and −60° C.

Absolute fiber attenuation measured at a wavelength of 1550 nanometers is provided (below) in Table 2.

TABLE 2

| (Microbend Sensitivity - 1550 nm) | | | | |
|---|---|---|---|---|
| Ex. | Optical Fiber glass fiber w/ primary coating (glass fiber and coating diameters) | 23° C. (dB/km) | −40° C. (dB/km) | −60° C. (dB/km) |
| 200-micron bend-insensitive SMFs with low-modulus primary coatings | | | | |
| A | BendBright$^{XS}$ ® w/ DP1014XS (125μ/155μ/199μ) | 1.114 | 1.019 | 1.002 |
| B | BendBright$^{XS}$ ® w/ DP1014XS (125μ/150μ/199μ) | 1.786 | 1.612 | 1.542 |
| C | BendBright$^{XS}$ ® w/ DP1016 (125μ/150μ/199μ) | 1.488 | 1.367 | 1.536 |

TABLE 2-continued (Microbend Sensitivity - 1550 nm)

| Ex. | Optical Fiber glass fiber w/ primary coating (glass fiber and coating diameters) | 23° C. (dB/km) | −40° C. (dB/km) | −60° C. (dB/km) |
|---|---|---|---|---|
| 200-micron bend-insensitive SMFs with conventional primary coatings |
| D | BendBright$^{XS}$ ® w/ DSM 950-076 (125μ/160μ/199μ) | 2.726 | 3.215 | 3.595 |
| E | BendBright$^{XS}$ ® w/ DSM 950-076 (125μ/150μ/199μ) | 4.288 | 4.766 | 5.150 |
| 200-micron macrobend-resistant SMFs with low-modulus primary coatings |
| F | BendBright ® w/ DP1014XS (125μ/150μ/199μ) | 4.683 | 4.348 | 4.878 |
| G | BendBright ® w/ DP1016 (125μ/150μ/199μ) | 5.985 | 5.800 | 6.399 |
| 242-micron enhanced SMF with low-modulus primary coatings |
| H | ESMF w/ DP1014 (125μ/190μ/242μ) | 0.705 | 0.663 | 0.648 |

Table 2 (above) shows that Draka Comteq's 125-micron BendBright$^{XS}$® bend-insensitive single-mode glass fiber facilitates a reduction in total optical-fiber diameter by permitting use of thinner primary and/or secondary coatings. In this regard, a 200-micron optical fiber using Draka Comteq's BendBright$^{XS}$® bend-insensitive single-mode glass fiber and relatively thin primary and secondary coatings provides microbending performance that approaches that of a 242-micron optical fiber having an enhanced standard single-mode fiber (ESMF) and thicker layers of comparable low-modulus primary and comparable secondary coatings.

Absolute fiber attenuation measured at a wavelength of 1310 nanometers is provided (below) in Table 3:

TABLE 3

(Microbend Sensitivity - 1310 nm)

| Ex. | Optical Fiber glass fiber w/ primary coating (glass fiber and coating diameters) | 23° C. (dB/km) | −40° C. (dB/km) | −60° C. (dB/km) |
|---|---|---|---|---|
| 200-micron bend-insensitive SMFs with low-modulus primary coatings |
| A | BendBright$^{XS}$ ® w/ DP1014XS (125μ/155μ/199μ) | 0.954 | 0.869 | 0.758 |
| B | BendBright$^{XS}$ ® w/ DP1014XS (125μ/150μ/199μ) | 1.574 | 1.426 | 1.478 |
| C | BendBright$^{XS}$ ® w/ DP1016 (125μ/150μ/199μ) | 1.496 | 1.381 | 1.509 |
| 200-micron bend-insensitive SMFs with conventional primary coatings |
| D | BendBright$^{XS}$ ® w/ DSM 950-076 (125μ/160μ/199μ) | 2.238 | 2.683 | 3.015 |
| E | BendBright$^{XS}$ ® w/ DSM 950-076 (125μ/150μ/199μ) | 4.020 | 4.363 | 4.671 |
| 200-micron macrobend-resistant SMFs with low-modulus primary coatings |
| F | BendBright ® w/ DP1014XS (125μ/150μ/199μ) | 2.670 | 2.447 | 2.761 |
| G | BendBright ® w/ DP1016 (125μ/150μ/199μ) | 3.725 | 3.550 | 3.927 |

The comparative 200-micron optical fiber designated Example D in Tables 2 and 3 (above) employed the secondary coating used in Draka Comteq's ColorLock$^{XS}$ brand coating system, albeit with a conventional primary coating. The comparative 200-micron optical fiber designated Example E in Tables 2 and 3 (above) employed both a conventional primary coating (i.e., DSM 950-076) and a conventional secondary coating (i.e., DSM 950-044).

Tables 2 and 3 (above) indicate that, all things being equal, the low-modulus primary coatings according to the present invention (e.g., Draka Comteq's ColorLock$^{XS}$ brand coating system) provide better microbending performance than do conventional coating systems. This superior microbending performance is especially important when employing a primary-coating layer at a significantly reduced thickness on a 125-micron glass fiber in order to achieve a nominal 200-micron optical fiber.

Moreover, Tables 2 and 3 (above) indicate that, all things being equal, Draka Comteq's single-mode glass fibers available under the trade name BendBright$^{XS}$®, which employ a trench-assisted design, provide better microbending performance than do single-mode fibers that do not employ trench-assisted and/or void-assisted design (e.g., Draka Comteq's single-mode glass fibers available under the trade name BendBright®). This is somewhat unexpected—trench-assisted and other bend-insensitive glass designs are generally understood to have more pronounced effects upon macrobending rather than microbending.

Example 8

Comparison of Microbend Sensitivity

The respective microbend sensitivities were further measured in accordance with the IEC fixed-diameter sandpaper drum test (i.e., IEC TR62221, Method B) for exemplary optical fibers, including (i) enhanced single-mode glass fibers (ESMF) with Draka Comteq's ColorLock brand coating system and (ii) Draka Comteq's single-mode glass fibers available under the trade name BendBright$^{XS}$® with Draka Comteq's improved ColorLock$^{XS}$ brand coating system.

As with Example 7 (above), the testing procedure for Example 8 was likewise an adaptation of IEC TR62221, Method B (i.e., the "Reduced-Diameter Optical-Fiber Microbend Sensitivity Test"). For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface. Then, each 440-meter fiber sample was wound in a single layer at about 1,470 mN (i.e., a controlled tension of 150 gf on the 300-millimeter diameter quartz drum using a Delachaux optical fiber winding apparatus). Two hours after winding, fiber attenuation was measured at room temperature (i.e., 23° C.) using an optical time domain reflectometer (OTDR).

Absolute fiber attenuation measured at a wavelength of 1550 nanometers is provided (below) in Table 4.

TABLE 4

(Microbend Sensitivity - 1550 nm)

| Ex. | Optical Fiber glass fiber w/ primary coating (glass fiber and coating diameters) | 23° C. (dB/km) |
|---|---|---|
| nominal 200-micron bend-insensitive SMFs with low-modulus primary coatings |
| A | BendBright$^{XS}$ ® w/ DP1014XS (125μ/153μ/194μ) | 0.97 |
| B | BendBright$^{XS}$ ® w/ DP1014XS (125μ/154μ/197μ) | 0.98 |

TABLE 4-continued (Microbend Sensitivity - 1550 nm)

| Ex. | Optical Fiber glass fiber w/ primary coating (glass fiber and coating diameters) | 23° C. (dB/km) |
|---|---|---|
| C | BendBright$^{XS}$® w/ DP1014XS (125μ/154μ/198μ) | 1.05 |
| D | BendBright$^{XS}$® w/ DP1014XS (125μ/158μ/200μ) | 0.74 |
| E | BendBright$^{XS}$® w/ DP1014XS (125μ/160μ/201μ) | 0.70 |
| 242-micron enhanced SMFs with conventional primary coatings | | |
| F | ESMF w/ DP1007 (125μ/190μ/242μ) | 2.004 |
| G | ESMF w/ DP1007 (125μ/190μ/242μ) | 1.661 |
| H | ESMF w/ DP1007 (125μ/190μ/242μ) | 1.542 |
| I | ESMF w/ DP1007 (125μ/190μ/242μ) | 1.568 |
| J | ESMF w/ DP1007 (125μ/190μ/242μ) | 1.973 | performance to that of a 242-micron, enhanced single-mode optical fiber (ESMF) that employs a comparable low-modulus primary coating and a comparable secondary coating. By way of example, the 200-micron optical fibers designated Examples A-E in Table 4 (above) provide comparable microbending performance to that of the 242-micron optical fiber designated Example H in Table 2 (above), which, as noted, is a 242-micron optical fiber having an enhanced standard single-mode fiber (ESMF) and thicker layers of comparable low-modulus primary and secondary coatings.

As noted, whereas single-mode glass fibers that are commercially available from Draka Comteq under the trade name BendBright® are compliant with the ITU-T G.652.D requirements, single-mode glass fibers that are commercially available from Draka Comteq under the trade names BendBright$^{XS}$® and BendBright-Elite™ are compliant with the ITU-T G.652.D requirements and the ITU-T G.657.A/B requirements. The respective ITU-T G.652 recommendations and the respective ITU-T G.657 recommendations are hereby incorporated by reference in their entirety. Table 5 (below) depicts fiber attributes specified by the ITU-T G.657.A/B recommendations.

TABLE 5

(ITU-T G.657.A/B Fiber Attributes)

| Attribute | Detail | G.657.A Value | G.657.B Value |
|---|---|---|---|
| Mode Field Diameter | Wavelength (nm) | 1310 | 1310 |
| | Range of Nominal Values (μm) | 8.6-9.5 | 6.3-9.5 |
| | Tolerance (μm) | ±0.4 | ±0.4 |
| Cladding Diameter | Nominal (μm) | 125 | 125 |
| | Tolerance (μm) | ±0.7 | ±0.7 |
| Core Concentricity Error | Maximum (μm) | 0.5 | 0.5 |
| Cladding Non-Circularity | Maximum (%) | 1.0 | 1.0 |
| Cable Cut-Off Wavelength | Maximum (nm) | 1260 | 1260 |
| Macrobending Loss | Radius (mm) | 15    10 | 15    10    7.5 |
| | Number of Turns | 10    1 | 10    1    1 |
| | Maximum @ 1550 nm (dB) | 0.25    0.75 | 0.03    0.1    0.5 |
| | Maximum @ 1625 nm (dB) | 1.0    1.5 | 0.1    0.2    1.0 |
| Proof Stress | Minimum (GPa) | 0.69 | 0.69 |
| Chromatic Dispersion Coefficient | $\lambda_{0min}$ (nm) | 1300 | 1300 |
| | $\lambda_{0max}$ (nm) | 1324 | 1420 |
| | $S_{0max}$ (ps/(nm$^2$ · km)) | ≤0.092 | ≤0.10 |

Table 4 (above) shows that, Draka Comteq's 125-micron BendBright$^{XS}$® bend-insensitive single-mode glass fiber in combination with (i) a low-modulus primary coating having an outer diameter of between about 150 microns and 160 microns and (ii) a secondary coating having an outer diameter of between about 195 microns and 200 microns provides significantly better microbending performance compared with that of conventional 125-micron enhanced single-mode glass fiber (ESMF) in combination with a 190-micron-diameter, conventional primary coating and a 242-micron-diameter, conventional secondary coating.

Stated otherwise, a nominal 200-micron optical fiber formed from Draka Comteq's 125-micron BendBright$^{XS}$® bend-insensitive single-mode glass fiber and Draka Comteq's ColorLock$^{XS}$ brand coating system provides superior microbending performance to that of a 242-micron, enhanced single-mode optical fiber (ESMF) that employs conventional primary and secondary coatings.

Moreover, a nominal 200-micron optical fiber formed from Draka Comteq's 125-micron BendBright$^{XS}$® bend-insensitive single-mode glass fiber and Draka Comteq's Color-Lock$^{XS}$ brand coating system provides similar microbending In this regard, this application incorporates by reference product specifications for the following Draka Comteq single-mode optical fibers: (i) Enhanced Single Mode Fiber (ESMF); (ii) BendBright® single-mode optical fiber; (iii) BendBright$^{XS}$® single-mode optical fiber; and (iv) BendBright-Elite™ single-mode optical fiber. This technical information is provided as Appendices 1-4, respectively, in priority U.S. Patent Application No. 61/252,941, for a High-Fiber-Density Optical-Fiber Cable (filed Oct. 19, 2009), which, as noted, is incorporated by reference in its entirety.

It is within the scope of the present invention to achieve reduced-diameter optical fibers by employing other kinds of trench-assisted, bend-insensitive glass fibers. In this regard, U.S. Patent Application Publication No. US 2008/0056654 A1 for a for a Low Bend Loss Single-Mode Optical Fiber (Bickham et al.), which is hereby incorporated by reference in its entirety, discloses a glass fiber that includes a cladding region with a depressed refractive index.

Furthermore, it is within the scope of the present invention to achieve reduced-diameter optical fibers by employing bend-insensitive glass fibers that include regular or random holes, whether continuous or discrete, in an annular region (e.g., an inner cladding). In this regard, U.S. Pat. No. 7,444,838 for a Holey Optical Fiber with Random Pattern of Holes and Method for Making the Same (Pickrell et al.) and U.S. Pat. No. 7,567,742 for a Holey Optical Fiber with Random Pattern of Holes and Method for Making Same (Pickrell et al.), each of which is hereby incorporated by reference in its entirety, disclose a glass fiber that includes a holey region (e.g., a cladding) with a random array of holes. Similarly, U.S. Pat. No. 7,450,806 for a Microstructured Optical Fibers and Methods (Bookbinder et al.), which is hereby incorporated by reference in its entirety, discloses a microstructured glass fiber that includes voids within the cladding region.

Other trench-assisted and/or void-assisted optical fibers are disclosed in the following patents and patent application publications, each of which is hereby incorporated by reference in its entirety: U.S. Pat. No. 4,852,968 for an Optical Fiber Comprising a Refractive Index Trench (Reed); U.S. Pat. No. 5,044,724 for a Method of Producing Optical Fiber, and Fiber Produced by the Method (Glodis et al.); U.S. Pat. No. 6,901,197 for a Microstructured Optical Fiber (Hasegawa et al.); U.S. Pat. No. 7,095,940 for an Optical Fiber, Method for Manufacturing Same and Optical Transmission Channel (Hayami et al.); U.S. Pat. No. 7,228,040 for a Hole-Assisted Single Mode Optical Fiber (Nakajima et al.); U.S. Pat. No. 7,239,784 for an Optical Fiber, Method for Manufacturing Same and Optical Transmission Channel (Hayami et al.); U.S. Pat. No. 7,292,762 for a Hole-Assisted Holey Fiber and Low Bending Loss Multimode Holey Fiber (Guan et al.); U.S. Pat. No. 7,433,566 for a Low Bend Loss Optical Fiber with High Modulus Coating (Bookbinder et al.); U.S. Pat. No. 7,526,166 for a High Numerical Aperture Fiber (Bookbinder et al.); U.S. Pat. No. 7,526,169 for a Low Bend Loss Quasi-Single-Mode Optical Fiber and Optical Fiber Line (Bickham et al.); U.S. Pat. No. 7,555,187 for a Large Effective Area Fiber (Bickham et al.); U.S. Pat. No. 7,450,807 for a Low Bend Loss Optical Fiber with Deep Depressed Ring (Bickham et al.); U.S. Pat. No. 7,574,088 for an Optical Fiber and Optical Fiber Ribbon, and Optical Interconnection System (Sugizaki et al.); U.S. Patent Application Publication No. US 2008/0166094 A1 for a Bend Resistant Multimode Optical Fiber (Bickham et al.); U.S. Patent Application Publication No. US 2008/0304800 A1 for an Optical Fiber with Large Effective Area (Bickham et al.); U.S. Patent Application Publication No. US 2009/0060437 A1 for Bend Insensitivity in Single Mode Optical Fibers (Fini et al.); U.S. Patent Application Publication No. US 2009/0126407 A1 for Methods for Making Optical Fiber Preforms and Microstructured Optical Fibers (Bookbinder et al.); U.S. Patent Application Publication No. US 2009/0154888 A1 for a Bend Resistant Multimode Optical Fiber (Steele et al.); U.S. Patent Application Publication No. US 2009/0169163 A1 for a Bend Resistant Multimode Optical Fiber (Steele et al.); and International Patent Application Publication No. WO 2009/064381 A1 for Methods for Making Optical Fiber Preforms and Microstructured Optical Fibers, (Bookbinder et al.).

It is believed that the foregoing glass fibers, as well as other glass fibers disclosed in previously incorporated-by-reference patent documents, might be combined with the low-modulus primary coatings as herein disclosed to achieve satisfactory, reduced-diameter optical fibers. As such, the resulting reduced-diameter optical fibers (e.g., holey fibers with low-modulus primary coatings) are within the scope of the present invention.

That said, it has been preliminarily observed that, with respect to reduced-diameter optical fibers having low-modulus primary coatings, bend-insensitive glass fibers having full-solid designs (e.g., 125-micron BendBright$^{XS}$® bend-insensitive single-mode glass fiber) seem to provide better microbending performance than do bend-insensitive glass fibers having hole-assisted designs.

Furthermore, it has been preliminarily observed that, with respect to reduced-diameter optical fibers, bend-insensitive glass fibers having full-solid designs (e.g., 125-micron BendBright$^{XS}$® bend-insensitive single-mode glass fiber) also seem to provide better mechanical performance than do bend-insensitive glass fibers having void-assisted designs (e.g., holey fibers). Those having ordinary skill in the art will appreciate that mechanical robustness is an important consideration when employing a bend-insensitive glass fiber within a nominal 200-micron optical fiber.

In this regard, 200-micron optical fibers that are formed from (i) Draka Comteq's 125-micron BendBright$^{XS}$® bend-insensitive single-mode glass fiber, which has a full-solid glass design, and (ii) Draka Comteq's ColorLock$^{XS}$ brand coating system demonstrate comparable mechanical reliability to that of a standard 242-micron optical fiber (e.g., a SSMF).

The 200-micron optical fibers that are formed from Draka Comteq's 125-micron BendBright$^{XS}$® bend-insensitive single-mode glass fiber and Draka Comteq's ColorLock$^{XS}$ brand coating system were tested for tensile strength and dynamic fatigue in accordance with the FOTP-28 standard, which is hereby incorporated by reference in its entirety. Representative mechanical reliability for these 200-micron optical fibers, which possessed differently colored secondary coatings, is provided (below) in Table 6.

TABLE 6

(Mechanical Reliability)

| ColorLock$^{XS}$ color | Tensile Strength 50% failure (kpsi) | Tensile Strength 15% failure (kpsi) | Dynamic Fatigue (n-value) |
|---|---|---|---|
| Blue | 711 | 539 | 22.5 |
| Orange | 712 | 626 | 22.0 |
| Green | 705 | 600 | 20.4 |
| Brown | 675 | 557 | 20.8 |
| Slate | 721 | 623 | 22.8 |
| White | 729 | 577 | 21.8 |
| Red | 708 | 577 | 20.9 |
| Black | 709 | 627 | 22.8 |
| Yellow | 715 | 540 | 21.4 |
| Violet | 713 | 580 | 21.6 |
| Rose | 723 | 557 | 21.9 |
| Aqua | 730 | 580 | 23.0 |

As will be understood by those having ordinary skill in the art, industry minimum requirements for tensile strength at fiber failure are 550 kpsi at the 50$^{th}$ percentile of the optical-fiber tensile-strength distribution (i.e., the median tensile strength) and 455 kpsi at the 15$^{th}$ percentile of the optical-fiber tensile-strength distribution.

The industry minimum requirement for the dynamic fatigue stress corrosion factor (n-value) is 18. In this regard, dynamic fatigue stress corrosion factor provides an indication of how fast a flaw in the glass fiber's silica structure propagates under strain.

As will be further understood by those having ordinary skill in the art, for both tensile strength and dynamic fatigue stress corrosion factor, an adequate sampling of optical fibers (e.g., n=30) provides a statistical estimate that facilitates characterization the optical-fiber population.

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers.

As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

It seems that reducing the diameter of the component glass fiber might make the resulting optical fiber more susceptible to microbending attenuation. For example, as compared with a component glass fiber having a standard diameter of 125 microns, a component glass fiber having a diameter of 110 microns might be twice as susceptible to microbending losses. That said, the advantages of further reducing optical-fiber diameter may be worthwhile for some optical-fiber applications.

In view of the foregoing and as noted, commonly assigned U.S. Patent Application No. 61/177,996 for a Reduced-Diameter Optical Fiber, filed May 13, 2009, (Overton), U.S. Patent Application No. 61/248,319 for a Reduced-Diameter Optical Fiber, filed Oct. 2, 2009, (Overton), and U.S. patent application Ser. No. 12/614,011 for a Reduced-Diameter Optical Fiber, filed Nov. 6, 2009, (Overton), now published as U.S. Patent Application Publication No. US 2010/0119202 A1, are incorporated by reference in their entirety.

As noted, the optical fiber according to the present invention may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

As discussed previously, combining (i) a coating system according to the present invention with (ii) a glass fiber having a refractive index profile that itself provides bend resistance (e.g., low macrobending sensitivity) has been found to provide unexpectedly superior reductions in microbend sensitivity. Indeed, bend-insensitive glass fibers are especially suitable for use with the coating system of the present invention (e.g., Draka Comteq's ColorLock$^{XS}$ brand coating system).

In accordance with the foregoing, the present optical fibers may be included in high-fiber-density optical-fiber cables. In achieving a reduced-diameter optical-fiber cable having a high fiber count and a high fiber density, the present optical fibers may possess either reduced dimensions (e.g., having an outermost diameter between about 150 microns and 230 microns) or more conventional dimensions (e.g., having an outermost diameter between about 230 microns and 265 microns).

In particular, an exemplary high-fiber-density cable includes a plurality of low-modulus buffer tubes (i.e., low-modulus micromodules, microsheaths, or "flextubes"), each of which may contain a plurality of the present optical fibers. Typically, the high-fiber-density cable includes between about 30 and 60 flextubes (e.g., 36 or 48 flextubes). Exemplary flextubes may contain 12, 18, or 24 optical fibers.

Typically, the flextubes are formed from a polymeric material having a Young's modulus of less than about 500 megapascals (MPa) (e.g., 300 MPa or less), typically less than about 250 MPa (e.g., 200 MPa or less, such as 50 MPa to 150 MPa), and more typically less than about 100 MPa. To achieve a Young's modulus less than about 100 MPa, exemplary flextubes may be formed from a thermoplastic copolyester elastomer.

For example, the flextubes may be formed from a material having a Young's modulus of between about 10 MPa and 90 MPa (e.g., 25 MPa to 75 MPa). For example, in some embodiments, the flextubes may be formed from a material having a Young's modulus greater than about 50 MPa. In other embodiments, the flextubes may be formed from a material having a Young's modulus of less than 50 MPa, such as between about 20 MPa and 40 MPa (e.g., between about 25 MPa and 30 MPa).

Moreover, the flextubes typically have a relatively thin wall with a thickness of between about 0.1 millimeter (mm) and 0.2 millimeter. In one embodiment, the flextubes have a wall thickness of about 0.15 millimeter or less. These flextubes can be readily accessed without special tools.

The flextubes may have an outer diameter of between about one millimeter and two millimeters. Typically, the flextubes have an outer diameter less than about 1.5 millimeters, such as between about 1.0 millimeter and 1.3 millimeters.

The present flextubes have a relatively high micromodule filling coefficient. As used herein, the term "micromodule filling coefficient" refers to the ratio of the total cross-sectional area of the fibers within a micromodule versus the inner cross-sectional area of that micromodule (i.e., defined by the inner boundary of the micromodule).

Optical-fiber cables of the present invention include flextubes typically having a micromodule filling coefficient greater than 0.5, such as greater than 0.65 (e.g., about 0.7). For example, a flextube (i) having an outer diameter of about 1.13 millimeters and an inner diameter of about 0.83 millimeter and (ii) containing twelve (12) 200-micron optical fibers would have a micromodule filling coefficient of about 0.7. A flextube (i) having an outer diameter of about 1.3 millimeters and an inner diameter of about 1.0 millimeter and (ii) containing twelve (12) 242-micron optical fibers would also have a micromodule filling coefficient of about 0.7.

Additionally, as used herein, the term "cumulative micromodule filling coefficient" refers to the ratio of the total cross-sectional area of the optical fibers enclosed within micromodules versus the sum of the inner cross-sectional areas of the micromodules containing those optical fibers.

A cable jacket surrounds the flextubes. In an exemplary embodiment, the cable jacket is formed of a polyolefin, such as polyethylene or polypropylene. Polyethylene, for instance, has a relatively low coefficient of friction, which allows it to be easily pulled through a cable duct. Other exemplary polymers that may be used to form the cable jacket include fluoropolymers, such as polyvinyl fluoride (PVF) or polyvinylidene difluoride (PVDF).

The material used to form the cable jacket may include additives such as nucleating agents, antioxidants, UV absorbers, and carbon black.

The cable jacket typically has an outer diameter of less than about 18 millimeters, typically less than about 17.5 millimeters, such as less than about 16 millimeters (e.g., about 14 millimeters). Those having ordinary skill in the art will appreciate that the outer diameter of the cable jacket depends upon the respective characteristics of the optical fibers and/or micromodules (e.g., numbers and dimensions) enclosed within the interior space defined by the cable jacket.

To ensure that the high-fiber-density cable has adequate crush resistance, in one embodiment the cable jacket has an average thickness of at least about two millimeters (e.g., about 2.2 millimeters). For example, a high-fiber-density cable having an outer diameter of about 16 millimeters would have an inner diameter of no more than about 12 millimeters. Alternatively, to the extent that crush resistance and/or tensile strength is less of a concern, the thickness of the cable jacket can be further reduced.

Accordingly, the present high-fiber-density cable complies with the IEC 60794-1-2 (method E3) and the IEC 60794-3-10 standards with regard to crush resistance. The IEC 60794-1-2 (method E3) and the IEC 60794-3-10 standards are hereby incorporated by reference in their entirety.

In addition, the optical-fiber cables in accordance with the present invention typically meet or exceed other International Electrotechnical Commission standards as set forth in the IEC 60794 standard, such as tensile strength (IEC 60794-1-2-E1), impact (IEC 60794-1-2-E4), torsion (IEC 60794-1-2-E7), bending (IEC 60794-1-2-E11), temperature cycling (IEC 60794-1-2-F1), and water tightness (IEC 60794-1-2-F5). These IEC 60794 standards are hereby incorporated by reference in their entirety.

The cable jacket typically includes one or more radial strength members (RSMs). For example, fiberglass reinforcing rods (e.g., glass-reinforced plastic (GRP)) may be incorporated into the cable jacket. The radial strength members typically have a total cross-sectional area so as to ensure that the cable jacket contracts (i.e., shrinks) less than about 0.5 percent at minimum operating temperatures (e.g., at about $-30°$ C.).

In this regard, exemplary radial strength members may have a diameter of between about 1.0 millimeter and 1.8 millimeters, such as about 1.4 millimeters. The strength members are typically positioned (e.g., embedded) within the cable jacket so that at least 0.4 millimeter of the jacket concentrically surrounds the strength member. In other words, the strength members are typically positioned at least 0.4 millimeter from both the inner and outer surfaces of the cable jacket. This positioning of the strength members ensures that the cable jacket does not "zipper" (i.e., open) along the strength members when the high-fiber-density cable is twisted or bent. As will be appreciated by those having ordinary skill in the art, zippering may occur when the mechanical integrity of the cable jacket is compromised after sufficient deterioration of the cable jacket. Accordingly, zippering may result in additional optical-fiber attenuation and possibly even mechanical damage to the enclosed optical fibers.

Within the cable jacket, the plurality of flextubes are typically stranded about each other to form a flexible stranded core. Such stranding can be accomplished in one direction (e.g., "S" helical stranding or "Z" helical stranding). In this regard, it has been observed that helical stranding helps to equalize the response of each flextube when the cable is subjected to bending. Alternatively, Reverse Oscillated Lay stranding, known as "S-Z" stranding, may be employed.

In another cable embodiment, the stranded core may be formed from multiple stranded elements that are stranded about each other. For example, each stranded element may include a plurality of flextubes (e.g., three, four, six, or twelve flextubes) stranded about each other.

One or more layers of high-strength yarns (e.g., aramid or non-aramid yarns) may be positioned parallel to or wrapped (e.g., contrahelically) around the stranded flextubes. Water-swellable tape may also be wrapped around the stranded flextubes. In some embodiments, the high-strength yarns and/or water-swellable tape may be secured with one or more binder threads. Ripcords may be placed inside (e.g., immediately beneath) the cable jacket.

The stranding lay length of the stranded flextubes is typically equal to at least about 30 times the theoretical stranded-core diameter, but no more than about 40 times the outer diameter of the reduced-diameter cable.

As used herein, the term "stranding lay length" refers to the longitudinal distance along the reduced-diameter cable in which the stranded flextubes complete one helical wrap.

Moreover, as used herein, the term "theoretical stranded-core diameter" refers to the diameter of the most compact configuration possible for arranging circular flextubes in layers.

By way of example, for a high-fiber-density cable having an outer diameter of about 16 millimeters, an inner diameter of about 12 millimeters, and a theoretical stranded-core diameter of about 11 millimeters, the flextubes' stranded lay length should be between about 330 millimeters and 640 millimeters.

Figure 13:
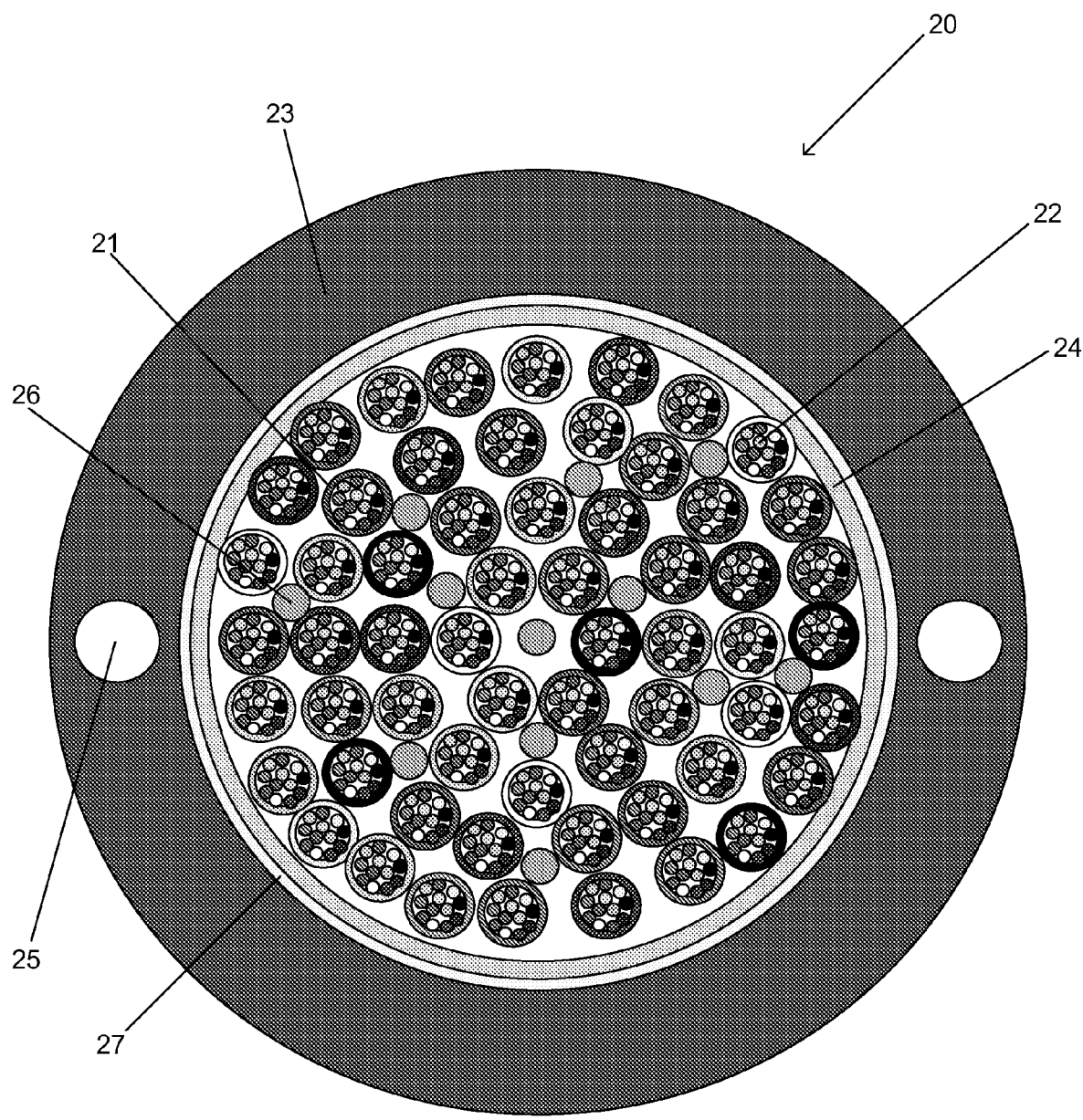
FIG. 13 schematically depicts an exemplary high count, high-fiber-density cable in accordance with the present invention.

By way of further example and as depicted in FIG. 13, 60 flextubes may be arranged in a 0-6-12-18-24 configuration (i.e., a configuration having concentric circles of 0, 6, 12, 18, and 24 flextubes). Such a configuration has a theoretical stranded-core diameter equal to nine times ($9\times$) the diameter of the flextubes.

In an alternative embodiment, 48 flextubes may be arranged in a 3-9-15-21 configuration, which has a theoretical stranded-core diameter equal to about eight times ($8\times$) the diameter of the flextubes.

With respect to the present high-fiber-density cable, yarns, nonwovens, fabrics (e.g., tapes), foams, or other materials containing water-swellable material and/or coated with water-swellable materials (e.g., including super absorbent polymers (SAPs), such as SAP powder) may be employed within the cable to provide water blocking.

In one embodiment, the flextubes themselves may include filling greases or lubricants (e.g., thixotropic filling greases) to promote water tightness. Alternatively, the high-fiber-density cable may include dry structures (i.e., grease-free flextubes).

The present high-fiber-density cable has a relatively high fiber density. As used herein, the term "cable fiber density" of an optical-fiber cable refers to the ratio of the total number of optical fibers within the optical-fiber cable versus the cross-sectional area of the optical-fiber cable as defined by the outer boundary (e.g., the outer diameter) of the protective outer jacket. Optical-fiber cables having higher cable fiber densities are desired, because such high-fiber-density cables have an increased number of optical fibers and/or require less space for installation.

The high-fiber-density cable in accordance with the present invention has a cable fiber density of at least about 2.0 fibers/mm$^2$ (e.g., 2.1-2.3 fibers/mm$^2$), typically at least about 2.4 fibers/mm$^2$ (e.g., 2.45-2.75 fibers/mm$^2$), and more typically at least about 2.85 fibers/mm$^2$ (e.g., 3.0-3.6 fibers/mm$^2$). In some embodiments, the present high-fiber-density cable has a cable fiber density of at least about 4.0 fibers/mm² (e.g., about 4.25), and perhaps 4.5 fibers/mm² or higher.

In this regard, reducing the thickness of the cable jacket will reduce cable diameter, thereby increasing cable fiber density. Higher cable fiber densities may be achieved, for example, by modifying (e.g., reducing) the cross-sections of the radial strength members. In some cable embodiments, it might be possible to exclude radial strength members altogether.

Moreover, as used herein, the term "inner cable fiber density" of an optical-fiber cable refers to the ratio of the total number of optical fibers within the optical-fiber cable versus the inner cross-sectional area of the optical-fiber cable as defined by the inner boundary (e.g., the inner diameter) of the protective outer jacket.

Typically, the high-fiber-density cable in accordance with the present invention has an inner cable fiber density of at least about 3.5 fibers/mm², more typically at least about 5.0 fibers/mm², such as about 6.0 fibers/mm² or more (e.g., about 7.0-7.5 fibers/mm²).

In one exemplary embodiment, the high-fiber-density cable in accordance with the present invention has a cable fiber density of at least about 2.4 fibers/mm² (e.g., 2.5-2.7 fibers/mm²). Typically, the high-fiber-density cable has a cable fiber density of at least about 2.8 fibers/mm², such as about 3.5 fibers/mm² or more. For example, a high-fiber-density cable, having an outer diameter of about 16 millimeters and containing 720 optical fibers having an outer diameter of about 200 microns, would have a cable fiber density of about 3.58 fibers/mm².

The 720 optical fibers may, for example, be contained in 60 flextubes containing 12 optical fibers or in 30 flextubes containing 24 optical fibers. By way of further example, a high-fiber-density cable (i) having an outer diameter of about 14 millimeters and (ii) containing 432 optical fibers, each having an outer diameter of about 200 microns, would have a cable fiber density of about 2.81 fibers/mm².

In accordance with the present invention, Table 7 (below) depicts various cable embodiments deploying 200-micron optical fibers:

TABLE 7

|  | Ex. 1 | Ex. 2 | Ex. 3 | Ex. 4 | Ex. 5 | Ex. 6 |
| --- | --- | --- | --- | --- | --- | --- |
| flextubes per cable | 72 | 60 | 48 | 36 | 36 | 30 |
| flextube outer diameter (mm) | 1.13 | 1.13 | 1.13 | 1.13 | 1.3 | 1.53 |
| flextube inner diameter (mm) | 0.85 | 0.85 | 0.85 | 0.85 | 1.03 | 1.26 |
| fibers per flextube | 12 | 12 | 12 | 12 | 18 | 24 |
| optical fibers per cable | 864 | 720 | 576 | 432 | 648 | 720 |
| optical fiber diameter (μm) | 200 | 200 | 200 | 200 | 200 | 200 |
| cable outer diameter (mm) | 17.1 | 15.9 | 14.9 | 13.6 | 14.8 | 15.5 |
| cable inner diameter (mm) | 12.7 | 11.4 | 10.4 | 9.1 | 10.3 | 11 |
| cable fiber density (fibers/mm²) | 3.76 | 3.63 | 3.30 | 2.97 | 3.77 | 3.82 |
| inner cable fiber density (fibers/mm²) | 6.82 | 7.05 | 6.78 | 6.64 | 7.78 | 7.58 |
| cumulative micromodule filling coefficient | 0.66 | 0.66 | 0.66 | 0.66 | 0.68 | 0.61 |

In accordance with the present invention, Table 8 (below) depicts various cable embodiments deploying 242-micron optical fibers:

TABLE 8

|  | Ex. 1 | Ex. 2 | Ex. 3 | Ex. 4 | Ex. 5 |
| --- | --- | --- | --- | --- | --- |
| flextubes per cable | 72 | 60 | 48 | 36 | 30 |
| flextube outer diameter (mm) | 1.3 | 1.3 | 1.4 | 1.3 | 1.8 |
| flextube inner diameter (mm) | 1.03 | 1.03 | 1.1 | 1.03 | 1.49 |
| fibers per flextube | 12 | 12 | 12 | 12 | 24 |
| optical fibers per cable | 864 | 720 | 576 | 432 | 720 |
| optical fiber diameter (μm) | 242 | 242 | 242 | 242 | 242 |
| cable outer diameter (mm) | 18.9 | 17.4 | 17.1 | 14.8 | 17.2 |
| cable inner diameter (mm) | 14.4 | 12.9 | 12.6 | 10.3 | 12.8 |
| cable fiber density (fibers/mm²) | 3.08 | 3.03 | 2.51 | 2.51 | 3.10 |
| inner cable fiber density (fibers/mm²) | 5.31 | 5.51 | 4.62 | 5.19 | 5.60 |
| cumulative micromodule filling coefficient | 0.66 | 0.66 | 0.58 | 0.66 | 0.63 |

FIG. 13 depicts an exemplary high-fiber-density cable 20 in accordance with the present invention. The high-fiber-density cable 20 includes sixty (60) stranded flextubes 21, each having twelve (12) optical fibers 22. Accordingly, as depicted in FIG. 13, the high-fiber-density cable 20 includes 720 optical fibers 22. The high-fiber-density cable 20 also contains water-swellable yarns 26, which may be positioned between and helically stranded with the flextubes 21. Water-swellable tape 24 and aramid yarns 27 surround the flextubes 21. A cable jacket 23 encloses the flextubes 21, the water-swellable tape 24, and the aramid yarns 27. As depicted in FIG. 13, the aramid yarns 27 are typically positioned between the water-swellable tape 24 and the cable jacket 23. Two radial strength members 25 are incorporated into the cable jacket 23.

The high-fiber-density cables according to the present invention are capable of achieving outstanding attenuation performance. In this regard, the attenuation of reduced-diameter cables may be evaluated via temperature-cycle testing. For example, a section of cable (e.g., a cable section of between about 1000 meters and 2000 meters) may be temperature cycled from −40° C. to 70° C. This temperature cycling is typically performed twice on the cable section.

Alternatively, more rigorous temperature cycling may be performed. For example, a section of the high-fiber-density cable may temperature cycled twice from −40° C. to 70° C., then aged for about five days at 85° C., then temperature cycled once from −40° C. to 70° C.

As used herein and unless otherwise specified, reference to "cable temperature cycling," "cable temperature cycle testing," or the "cable temperature cycle test" refers to the testing procedures set forth in Table 9 (below). In particular, Table 9 depicts the approximate temperature and soak time of the various steps of the foregoing temperature cycle testing.

TABLE 9

| Temperature (° C.) | Approximate Soak Time (hours) |
| --- | --- |
| 20 | initial |
| −20 | 15-25 |
| −30 | 15-25 |
| −40 | 15-25 |
| 60 | 15-25 |
| 70 | 65-75 |
| −20 | 15-25 |
| −30 | 20-30 |
| −40 | 20-30 |
| 70 | 15-20 |
| 20 | 110-120 |
| 85 | 120-130 |
| −20 | 15-25 |
| −40 | 15-25 |
| 70 | 15-20 |
| 20 | final |

During and after cable temperature cycling, the attenuation of the optical fibers contained within the high-fiber-density cable is measured. For single-mode optical fibers, attenuation is often measured at wavelengths of 1550 nanometers (nm) and 1625 nanometers. During cable temperature cycling, the optical fibers contained within the present high-fiber-density cable typically experience an increase in attenuation (i.e., added loss) of no more than about 0.1 dB/km (e.g., less than about 0.05 dB/km, such as less than about 0.03 dB/km).

Temperature cycle testing may also be performed in accordance with IEC 60794-1-2 Method F1, which, as noted, is incorporated by reference. In accordance with IEC 60794-1 Method F1, the optical fibers within the present high-fiber-density cable typically experience an increase in attenuation of no more than about 0.1 dB/km.

The foregoing high-fiber-density cable design and the present bend-insensitive fiber technology provides a reduced-diameter cable having a high fiber density, yet satisfies industry standards with respect to attenuation during installation and operation.

To supplement the present disclosure, this application incorporates entirely by reference the following commonly assigned patents, patent application publications, and patent applications: U.S. Pat. No. 7,623,747 for a Single Mode Optical Fiber (de Montmorillon et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0214649 A1 for a Optical Fiber Amplifier Having Nanostructures, filed Feb. 19, 2010, (Burov et al.); U.S. Patent Application Publication No. US2010/0254653 A1 for a Multimode Fiber, filed Apr. 22, 2010, (Molin et al.); and U.S. patent application Ser. No. 12/887,813 for a Optical Fiber for Sum-Frequency Generation, filed Sep. 22, 2010, (Richard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups;

U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Lovie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); and U.S. patent application Ser. No. 12/881,598 for Methods and Devices for Cable Insertion into Latched Conduit, filed Sep. 14, 2010, (Leatherman et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber cable, comprising:
   a plurality of micromodules positioned within and surrounded by a polymeric cable jacket, one or more of said micromodules enclosing a plurality of optical fibers;
   wherein one or more of said optical fibers comprise a substantially cured primary coating surrounding a glass fiber, said substantially cured primary coating possessing (i) an in situ modulus of less than about 0.50 MPa and (ii) a glass transition temperature of less than about −55° C.;
   wherein one or more of said optical fibers have:
      at a wavelength of 1310 nanometers, a mode field diameter with nominal values of between 8.6 microns and 9.5 microns and a tolerance of ±0.4 micron;
      a cable cutoff wavelength of no more than 1260 nanometers;
      a zero chromatic dispersion wavelength of at least 1300 nanometers and no more than 1324 nanometers;
      at the zero chromatic dispersion wavelength, a slope of no more than 0.092 ps/(nm$^2$·km);
      at a wavelength of 1550 nanometers, a macrobending loss of (i) no more than 0.25 dB for ten turns around a mandrel radius of 15 millimeters and (ii) no more than 0.75 dB for one turn around a mandrel radius of 10 millimeters; and at a wavelength of 1625 nanometers, a macrobending loss of (i) no more than 1.0 dB for ten turns around a mandrel radius of 15 millimeters and (ii) no more than 1.5 dB for one turn around a mandrel radius of 10 millimeters; and wherein the optical-fiber cable possesses an inner cable fiber density of at least about 3.75 fibers/mm$^2$.

2. An optical-fiber cable according to claim 1, wherein one or more of said optical fibers possess an outer diameter of between about 190 microns and 210 microns.

3. An optical-fiber cable according to claim 1, wherein one or more of said optical fibers comprise a substantially cured primary coating that defines a primary coating layer having an outer diameter of less than about 165 microns.

4. An optical-fiber cable according to claim 1, wherein one or more of said optical fibers comprise a substantially cured primary coating possessing an in situ modulus of between 0.2 MPa and 0.5 MPa.

5. An optical-fiber cable according to claim 1, wherein one or more of said optical fibers comprise a substantially cured primary coating possessing an in situ modulus of between 0.3 MPa and 0.4 MPa.

6. An optical-fiber cable according to claim 1, wherein one or more of said optical fibers comprise a substantially cured primary coating possessing a glass transition temperature of less than about −60° C.

7. An optical-fiber cable according to claim 1, wherein one or more of said optical fibers comprise a secondary coating defining a secondary coating layer having an outer diameter of between about 192 microns and 202 microns.

8. An optical-fiber cable according to claim 1, wherein one or more of said optical fibers comprise a glass fiber having a full-solid structure.

9. An optical-fiber cable according to claim 1, wherein one or more of said optical fibers comprise a glass fiber including regular or random holes.

10. An optical-fiber cable according to claim 1, wherein, at a wavelength of 1310 nanometers, said one or more optical fibers possess median absolute fiber attenuation of less than 2.0 dB/km as measured at 23° C., −40° C., and/or −60° C. in accordance with a modified IEC TR62221 fixed-diameter sandpaper drum test ("Reduced-Diameter Optical-Fiber Microbend Sensitivity Test") in which a 440-meter fiber sample is wound in a single layer at about 1,470 mN on a 300-mm diameter quartz drum that is wrapped with 320-grit sandpaper to create a rough surface.

11. An optical-fiber cable according to claim 1, wherein, at a wavelength of 1550 nanometers, said one or more optical fibers possess median absolute fiber attenuation of less than 2.0 dB/km as measured at 23° C., −40° C., and/or −60° C. in accordance with a modified IEC TR62221 fixed-diameter sandpaper drum test ("Reduced-Diameter Optical-Fiber Microbend Sensitivity Test") in which a 440-meter fiber sample is wound in a single layer at about 1,470 mN on a 300-mm diameter quartz drum that is wrapped with 320-grit sandpaper to create a rough surface.

12. An optical-fiber cable according to claim 1, wherein said one or more optical fibers comprise single-mode optical fibers having, at a wavelength of 1550 nanometers, an increase in attenuation of no more than about 0.1 dB/km during cable temperature cycling from −40° C. to 70° C. and, at a wavelength of 1625 nanometers, an increase in attenuation of no more than about 0.1 dB/km during cable temperature cycling from −40° C. to 70° C.

13. An optical-fiber cable according to claim 1, wherein said one or more optical fibers comprise single-mode optical fibers having, at a wavelength of 1550 nanometers, a median increase in attenuation of no more than about 0.03 dB/km during cable temperature cycling from −40° C. to 70° C. and, at a wavelength of 1625 nanometers, a median increase in attenuation of no more than about 0.03 dB/km during cable temperature cycling from −40° C. to 70° C.

14. An optical-fiber cable according to claim 1, wherein the optical-fiber cable possesses an inner cable fiber density of at least about 5.0 fibers/mm$^2$.

15. An optical-fiber cable according to claim 1, wherein the optical-fiber cable possesses an inner cable fiber density of at least about 7.5 fibers/mm$^2$.

16. An optical-fiber cable according to claim 1, wherein the optical-fiber cable possesses a cable fiber density of at least about 2.6 fibers/mm$^2$.

17. An optical-fiber cable according to claim 1, wherein the optical-fiber cable possesses a cable fiber density of at least about 2.85 fibers/mm$^2$.

18. An optical-fiber cable according to claim 1, wherein the optical-fiber cable complies with the crush-resistance standard set forth in IEC 60794-1-2 (method E3) and/or the crush-resistance standard set forth in IEC 60794-3-10.

19. An optical-fiber cable, comprising:
a polymeric cable jacket; and
a plurality of micromodules positioned within said polymeric cable jacket, wherein one or more of said micromodules enclose a plurality of optical fibers having an outer diameter of about 210 microns or less;
wherein each of said optical fibers comprises a substantially cured primary coating surrounding a glass fiber and defining a primary coating layer;
wherein, at a wavelength of 1310 nanometers, each of said optical fibers possesses absolute fiber attenuation of less than 2.0 dB/km as measured at 23° C., −40° C., and/or −60° C. in accordance with a modified IEC TR62221 fixed-diameter sandpaper drum test ("Reduced-Diameter Optical-Fiber Microbend Sensitivity Test") in which a 440-meter fiber sample is wound in a single layer at about 1,470 mN on a 300-mm diameter quartz drum that is wrapped with 320-grit sandpaper to create a rough surface;
wherein the optical-fiber cable possesses a cable fiber density of at least about 2.2 fibers/mm$^2$.

20. An optical-fiber cable according to claim 19, wherein said micromodules comprise polymeric material having a Young's modulus of less than about 250 MPa.

21. An optical-fiber cable according to claim 19, wherein one or more of said optical fibers comprise a substantially cured primary coating that defines a primary coating layer having an outer diameter of between about 152.5 microns and 157.5 microns.

22. An optical-fiber cable according to claim 19, wherein one or more of said optical fibers comprise a substantially cured primary coating possessing (i) an in situ modulus of between 0.2 MPa and 0.5 MPa and (ii) a glass transition temperature of less than about −50° C.

23. An optical-fiber cable according to claim 19, wherein one or more of said optical fibers comprises a secondary coating defining a secondary coating layer having an outer diameter of less than about 205 microns.

24. An optical-fiber cable according to claim 19, wherein, at a wavelength of 1310 nanometers, said optical fibers possess median absolute fiber attenuation of less than 1.5 dB/km as measured at 23° C., −40° C., and/or −60° C. in accordance with a modified IEC TR62221 fixed-diameter sandpaper drum test ("Reduced-Diameter Optical-Fiber Microbend Sensitivity Test") in which a 440-meter fiber sample is wound in a single layer at about 1,470 mN on a 300-mm diameter quartz drum that is wrapped with 320-grit sandpaper to create a rough surface.

25. An optical-fiber cable according to claim 19, wherein said optical fibers comprise one or more single-mode optical fibers having, at a wavelength of 1550 nanometers, an increase in attenuation of no more than about 0.1 dB/km during cable temperature cycling from −40° C. to 70° C. and, at a wavelength of 1625 nanometers, an increase in attenuation of no more than about 0.1 dB/km during cable temperature cycling from −40° C. to 70° C.

26. An optical-fiber cable according to claim 19, wherein the optical-fiber cable possesses a cable fiber density of at least about 2.6 fibers/mm$^2$.

27. An optical-fiber cable according to claim 19, wherein the optical-fiber cable possesses a cable fiber density of at least about 2.85 fibers/mm$^2$.

28. An optical-fiber cable according to claim 19, wherein the optical-fiber cable complies with the crush-resistance standard set forth in IEC 60794-1-2 (method E3) and/or the crush-resistance standard set forth in IEC 60794-3-10.

29. An optical-fiber cable, comprising:
   at least 720 optical fibers, each said optical fiber having an outer diameter of between about 190 microns and 210 microns, wherein one or more of said optical fibers comprise a substantially cured primary coating possessing (i) an in situ modulus of less than about 0.5 MPa and (ii) a glass transition temperature of less than about −55° C.;
   a plurality of micromodules, and each said micromodule surrounding one or more of said optical fibers such that each of said optical fibers is positioned within one of said micromodules; and
   a cable jacket surrounding said micromodules, said cable jacket having an outer diameter of about 16 millimeters or less;
   wherein at least 360 of said optical fibers comprise a substantially cured primary coating surrounding a glass fiber having a diameter of about 125 microns, said primary coating defining a primary coating layer;
   wherein, for at least 360 of said optical fibers, (i) at the 50th percentile of the optical fiber tensile-strength distribution, the tensile strength at fiber failure is at least 550 kpsi, and (ii) at the 15th percentile of the optical fiber tensile-strength distribution, the tensile strength at fiber failure is at least about 455 kpsi;
   wherein at least 360 of said optical fibers have a dynamic fatigue stress corrosion factor (n-value) of at least 18;
   wherein at least 360 of said optical fibers possess absolute fiber attenuation of less than 2.0 dB/km as measured at 23° C., −40° C., and/or −60° C. in accordance with a modified IEC TR62221 fixed-diameter sandpaper drum test ("Reduced-Diameter Optical-Fiber Microbend Sensitivity Test") in which a 440-meter fiber sample is wound in a single layer at about 1,470 mN on a 300-mm diameter quartz drum that is wrapped with 320-grit sandpaper to create a rough surface.

30. An optical-fiber cable according to claim 29, wherein said micromodules comprise polymeric material having a Young's modulus of between about 10 MPa and 90 MPa.

31. An optical-fiber cable according to claim 29, wherein said optical fibers comprise one or more single-mode optical fibers having, at a wavelength of 1550 nanometers, an increase in attenuation of no more than about 0.1 dB/km during cable temperature cycling from −40° C. to 70° C. and, at a wavelength of 1625 nanometers, an increase in attenuation of no more than about 0.1 dB/km during cable temperature cycling from −40° C. to 70° C.

32. An optical-fiber cable according to claim 29, wherein the optical-fiber cable complies with the crush-resistance standard set forth in IEC 60794-1-2 (method E3) and/or the crush-resistance standard set forth in IEC 60794-3-10.

33. An optical-fiber cable according to claim 29, wherein one or more of said optical fibers have:
   at a wavelength of 1310 nanometers, a mode field diameter with nominal values of between 8.6 microns and 9.5 microns and a tolerance of ±0.4 micron;
   a cable cutoff wavelength of no more than 1260 nanometers;
   a zero chromatic dispersion wavelength of at least 1300 nanometers and no more than 1324 nanometers;
   at the zero chromatic dispersion wavelength, a slope of no more than 0.092 ps/(nm$^2$·km);
   at a wavelength of 1550 nanometers, a macrobending loss of (i) no more than 0.25 dB for ten turns around a mandrel radius of 15 millimeters and (ii) no more than 0.75 dB for one turn around a mandrel radius of 10 millimeters; and
   at a wavelength of 1625 nanometers, a macrobending loss of (i) no more than 1.0 dB for ten turns around a mandrel radius of 15 millimeters and (ii) no more than 1.5 dB for one turn around a mandrel radius of 10 millimeters.

34. An optical-fiber cable according to claim 29, wherein one or more of said optical fibers have:
   at a wavelength of 1310 nanometers, a mode field diameter with nominal values of between 6.3 microns and 9.5 microns and a tolerance of ±0.4 micron;
   a cable cutoff wavelength of no more than 1260 nanometers;
   a zero chromatic dispersion wavelength of at least 1300 nanometers and no more than 1420 nanometers;
   at the zero chromatic dispersion wavelength, a slope of no more than 0.10 ps/(nm$^2$·km);
   at a wavelength of 1550 nanometers, a macrobending loss of (i) no more than 0.03 dB for ten turns around a mandrel radius of 15 millimeters, (ii) no more than 0.1 dB for one turn around a mandrel radius of 10 millimeters, and (iii) no more than 0.5 dB for one turn around a mandrel radius of 7.5 millimeters; and
   at a wavelength of 1625 nanometers, a macrobending loss of (i) no more than 0.1 dB for ten turns around a mandrel radius of 15 millimeters, (ii) no more than 0.2 dB for one turn around a mandrel radius of 10 millimeters, and (iii) no more than 1.0 dB for one turn around a mandrel radius of 7.5 millimeters.

\* \* \* \* \*